(12) United States Patent
Tanaka et al.

(10) Patent No.: US 7,039,504 B2
(45) Date of Patent: May 2, 2006

(54) VEHICLE BACKWARD MOVEMENT ASSIST DEVICE AND VEHICLE PARKING ASSIST DEVICE

(75) Inventors: Yuu Tanaka, Aichi-ken (JP); Yoshifumi Iwata, Anjo (JP); Hisashi Satonaka, Susono (JP); Tomohiko Endo, Toyota (JP); Yuichi Kubota, Okazaki (JP); Akira Matsui, Toyota (JP); Hideyuki Iwakiri, Tajimi (JP); Toru Sugiyama, Toyota (JP); Seiji Kawakami, Susono (JP); Katsuhiko Iwazaki, Shizuoka-ken (JP); Hiroaki Kataoka, Susono (JP)

(73) Assignees: Aisin Seiki Kabushiki Kaisha, Aichi-ken (JP); Toyota Jidosha Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 10/927,220

(22) Filed: Aug. 27, 2004

(65) Prior Publication Data
US 2005/0055139 A1    Mar. 10, 2005

(30) Foreign Application Priority Data
Aug. 28, 2003 (JP) .............................. 2003-304103

(51) Int. Cl.
G06F 7/00 (2006.01)
(52) U.S. Cl. .............................. 701/1; 701/36; 701/41; 701/300; 318/587
(58) Field of Classification Search .................... 701/1, 701/36, 41, 300, 301, 91; 340/932.2, 435, 340/436, 903; 318/580, 587; 348/118, 148, 348/139; 180/204
See application file for complete search history.

(56) References Cited

U.S. PATENT DOCUMENTS

| | | | |
|---|---|---|---|
| 6,173,229 B1 * | 1/2001 | Fennel et al. .................. 701/91 |
| 6,275,754 B1 | 8/2001 | Shimizu et al. |
| 6,463,363 B1 * | 10/2002 | Okuda ............................ 701/1 |
| 6,611,744 B1 * | 8/2003 | Shimazaki et al. ........... 701/41 |
| 6,621,421 B1 * | 9/2003 | Kuriya et al. ............. 340/932.2 |
| 6,683,589 B1 * | 1/2004 | Sano et al. .................... 345/60 |
| 6,704,653 B1 * | 3/2004 | Kuriya et al. ................ 701/301 |
| 6,711,473 B1 * | 3/2004 | Shimazaki et al. ............. 701/1 |
| 6,776,117 B1 * | 8/2004 | D'Onofrio ................. 116/28 R |
| 6,898,527 B1 * | 5/2005 | Kimura et al. .............. 701/301 |
| 2001/0026317 A1 | 10/2001 | Kakinami et al. |

FOREIGN PATENT DOCUMENTS

EP     1 297 999 A      4/2003
JP     11-208420 A2     8/1999

* cited by examiner

*Primary Examiner*—Richard M. Camby
(74) *Attorney, Agent, or Firm*—Sughrue Mion, PLLC

(57) ABSTRACT

A vehicle backward movement assist device includes a vehicle path determining means for determining a path from a current position of the vehicle moved at a moving amount detected by a vehicle moving amount detecting means to a first target position or a second target position, the vehicle path determining means determining the path by repeatedly calculating the path, and a displaying means for displaying an image of a rear view from a captured by an image capturing means, the displaying means superimposing the first or second target position of the vehicle moved based upon the first or second target position and the detected moving amount on the image of the rear view from the vehicle, the second target position calculated by updating the first target position.

20 Claims, 15 Drawing Sheets

VEHICLE BACKWARD MOVEMENT ASSIST DEVICE AND VEHICLE PARKING ASSIST DEVICE

CROSS REFERENCE TO RELATED APPLICATIONS

This application is based on and claims priority under 35 U.S.C. §119 with respect to Japanese Patent Application 2003-304103, filed on Aug. 28, 2003, the entire content of which is incorporated herein by reference.

FIELD OF THE INVENTION

This invention generally relates to a vehicle parking assist device capable of assisting a vehicle maneuver such as a back-in parking and a parallel parking when a vehicle turns its orientation at tight and restrictive spaces such as less-traffic three-forked road and intersection. More particularly, this invention pertains to a vehicle backward movement assist device having a vehicle parking assist device capable of assisting a vehicle maneuver such as a back-in parking and a parallel parking when a vehicle turns its orientation at tight and restrictive spaces such as at less-traffic three-forked road and intersection.

BACKGROUND

Back-in parking or parallel parking generally require a relatively high maneuvering skill of a steering wheel. Especially, many beginning drivers are not good at the back-in parking or the parallel parking. In light of foregoing, recent suggestions have lead to a parking assist device capable of assisting the vehicle maneuvering upon the vehicle parking. For example, as a type of the parking assist device, a parking guiding device is described in JP11(1999)-208420A2. In this parking guiding device, a target parking position range, which is computed by a microcomputer mounted on a vehicle, is displayed and superimposed on an image of a target parking rage, which is taken by a camera mounted on a vehicle side body.

However, according to the above-described parking guiding device, which sets the target parking position with the image captured by the camera, there is a relatively long interval between the an the target parking position and a vehicle current position when the vehicle is about to back up. In this case, the target parking position may be displayed at a relatively small scale such that it may be difficult for a driver to set the target parking position with high precision. Therefore, there has been a possibility that the drive may be guided to an unwilling space when the vehicle is moved for parking and is approaching the target parking position. Under this condition, a relative relationship between the initially set target parking position and the current vehicle position after the rearward movement has not been updated. Therefore, even when the driver attempts to set the target parking position again, it may take time for the drive to modify the target parking position to be displayed.

The above mentioned matter that it may take time for the driver to modify the target parking position to be displayed may occur when the vehicle backs up in error during the target parking position modification.

A need exists for providing a vehicle backward movement assist device capable of updating and displaying a target parking position in response to a vehicle post-position when the vehicle moves.

SUMMARY OF THE INVENTION

According to an aspect of the present invention, a vehicle backward movement assist device includes an image capturing means for capturing an image of a rear view from a vehicle, a target position inputting means for setting a first target position of the vehicle to be backed up, a vehicle moving amount detecting means for detecting a moving amount of the vehicle to be backed up, a vehicle path determining means for determining a path from a current position of the vehicle moved at the moving amount detected by the vehicle moving amount detecting means to the first target position or a second target position, the vehicle path determining means determining the path by repeatedly calculating the path, and a displaying means for displaying the image of the rear view from the vehicle, the displaying means superimposing the first or second target position of the vehicle moved based upon the first or second target position and the detected moving amount on the image of the rear view from the vehicle, the second target position calculated by updating the first target position.

It is preferable that the displaying means displays the image of the rear view from the vehicle and superimposes the first or second target position of the vehicle moved based upon the first or second target position and the detected moving amount on the image of the rear view from the vehicle before the first or second target parking position is set by the target parking position inputting means. Therefore, a further operation to set the target parking position continuously can be reduced.

According to another aspect of the present invention, a vehicle backward movement assist device includes a camera fixed at a portion of a vehicle so as to capture a rear view from the vehicle, a target position confirmation key adjusted to set a first target position of the vehicle to be backed up, at least a pair of wheel speed sensors mounted at a pair of vehicle wheels so as to detect a moving amount of the vehicle to be backed up, a computer for determining a path from a current position of the vehicle moved at the moving amount detected by the at least pair of wheel speed sensors to the first target position or a second target position, the vehicle path determining means determining the path by repeatedly calculating the path, a display to display an image of the rear view from the vehicle, the display adjusted to superimpose the first or second target position of the vehicle moved based upon the first or second target position and the detected moving amount on the image of the rear view from the vehicle, the second target position calculated by updating the first target position.

According to further aspect of the present invention, a method of guiding a vehicle parking maneuver includes the steps of judging whether a shift lever has been shifted to a reverse range, displaying an image of a rear view from a vehicle at a display when the shift lever has been shifted to the reverse range, judging a vehicle parking mode either at a back-in parking mode or at a parallel parking mode, calculating a first target parking position in accordance with the vehicle parking mode, superimposing the first target parking position on the image of the rear view from the vehicle, calculating a vehicle path from a vehicle current position to the first target parking position, judging whether the vehicle has moved after the vehicle path calculation, calculating a relative relationship between the current position of the vehicle after the vehicle movement and the first target parking position when the vehicle is judged to have moved, and updating the first target parking position to a second target parking position. The second target parking position is superimposed on the image of the rear view from the vehicle.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

An embodiment of the present invention will be described hereinbelow in detail with reference to the accompanying drawings.

Figure 1:
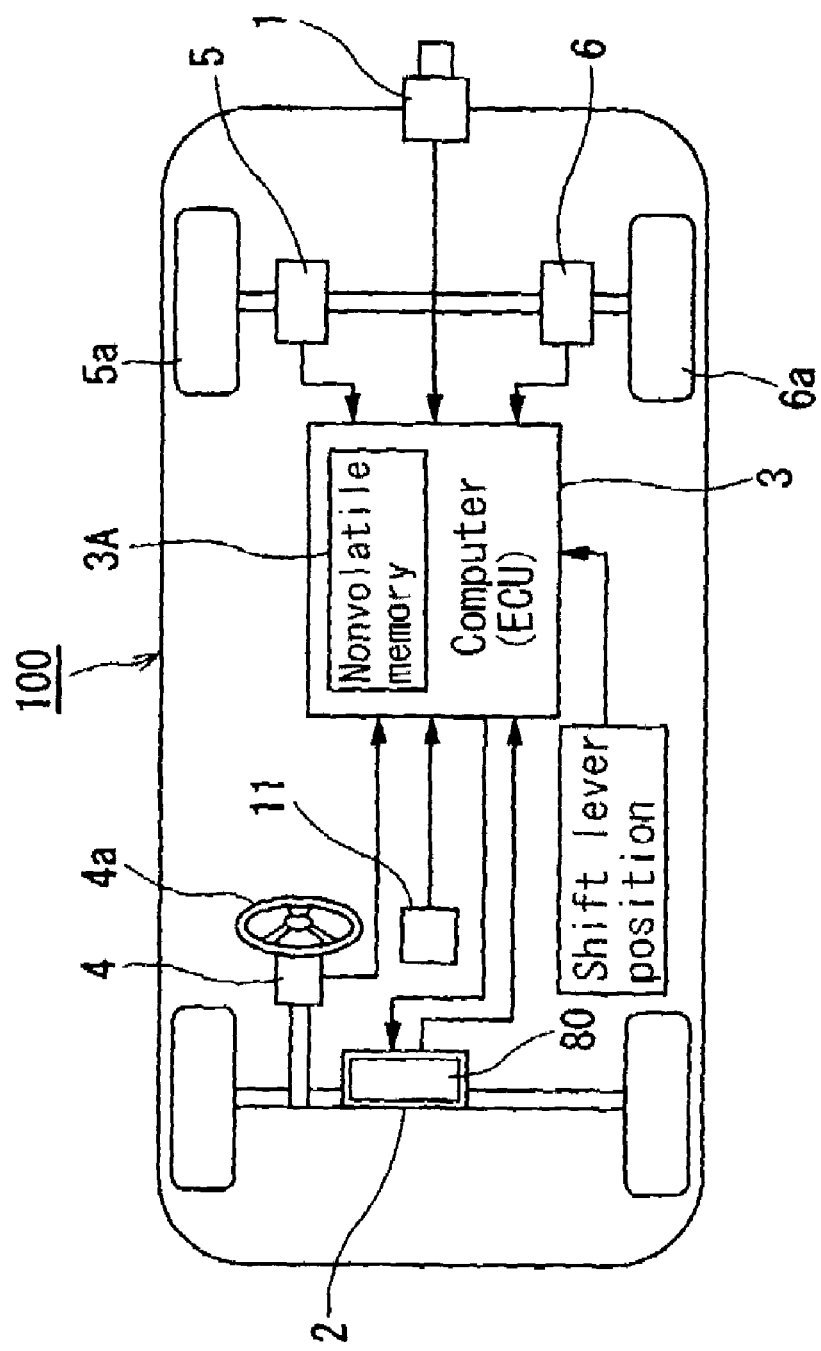
FIG. 1 is a block view schematically illustrating an entire structure of a vehicle mounted with a vehicle parking assist device according to an embodiment of the present invention.

With reference to FIG. 1, a camera 1, which is fixedly mounted at a rear portion of a vehicle 100, serves as an image capturing means 60 for capturing an image of a rear view of the vehicle 100. As far as the camera 1 can capture the image of the rear view from the vehicle 100, any type of camera such as a wide angle camera, a standard angle camera, and so on as non-limiting examples can be applied. Generally, a charged coupled device (CCD) camera is employed. When the wide angle camera is applied as the camera 1, the camera is required with compensation. A display 2 directly displays the image of the rear view stereo-image-picked up by the camera 1 via a signal process. A target parking position (i.e. referred to as a target position when this embodiment is applied for a vehicle backward movement assist device) computed by a computer (ECU, a controlling means) 3 is superimposed on the image of the camera 1 and is displayed together on the display 2. The display 2 serves as a displaying means 70 along with the ECU 3.

A steering angle sensor 4 detects a turning angle of a steering wheel 4a. A rear-right wheel speed sensor 5 mounted on a rear-right wheel 5a and a rear-left wheel speed sensor 6 mounted on a rear-left wheel 6a detect a vehicle moving distance, a current condition of the vehicle 100 and an expected post-position of the vehicle 100, respectively. The steering angle sensor 4, the rear-right wheel speed sensor 5 and the rear-left wheel speed sensor 6 serve as a vehicle moving amount detecting means 40 for detecting the movement of the vehicle 100 along with the ECU 3. The steering angle sensor 4 serves as a parking mode judging means 10 for judging under which parking mode the vehicle 100 has been, based upon a vehicle running locus within a predetermined distance or time immediately before a not-illustrated shift lever is shifted to a reverse range, along with the ECU 3. As described above, the vehicle moving amount detecting means 40 detects the moving amount of the vehicle 100. The vehicle moving amount is referred to for determining the path from the vehicle current position to the target parking position. The vehicle moving amount detecting means 40 can be employed for judging whether the traveling vehicle is at an appropriate position. Therefore, it is preferable that the vehicle moving amount detecting means 40 can detect an accurate steering wheel position and an accurate vehicle wheel position. Fundamentally, it is preferable that the vehicle be provided with wheel speed sensors, which are mounted at least on both vehicle wheels, as the vehicle moving amount detecting means 40. The steering angle sensor 4 and the ECU 3 judge that the vehicle 100 is under a parallel parking mode when a turning angle of the steering angle sensor 4 is substantially equal to or less than a predetermined threshold angle value.

As described above, according to the parking mode judging means 10, the vehicle 100 is judged to have been under the parallel parking mode when a maximum change of the steering angle, which is evaluated within the predetermined distance or time immediately before the reverse shift timing, is as little as expected when the shift lever is shifted to the reverse range. On the other hand, the vehicle 100 is judged to have been under a back-in parking mode when the maximum change of the steering angle is as large as expected when the shift lever is shifted to the reverse range. Therefore, the steering angles are memorized every predetermined vehicle moving distance or every predetermined time. In this case, it is preferable that a memorizing means for memorizing the steering angles be a shift register capable of sequentially deleting the steering angles, of which information have been memorized during a period corresponding to more than the predetermined vehicle moving distance or during a period corresponding to more than the predetermined time.

A transparent touch panel 80 is attached to be overlapped on a surface of the display 2 disposed in an instrument panel of the vehicle 100. A target parking position confirmation key 83 (i.e., a target position confirmation key) is a touch key arranged at a bottom-right corner of the touch panel 80. According to the embodiment of the present invention, the touch panel 80 is integrally provided with the display 2 positioned in the vicinity of a driver's seat. Alternatively, the touch panel 80 can be separated from the display 2. The target parking position confirmation key 83 is pushed by the driver when the driver confirms a position displayed on the display 2 as a target parking position when the vehicle is moved backward for the parking and so on. Therefore, the target parking position confirmation key 83 serves as a target parking position inputting means 20 (i.e., a target position inputting means and a target parking position inputting means). Alternatively, the touch panel 80 can be independently provided with a stick key, a touch key, a button switch or the like. Therefore, according to the embodiment of the present invention, the target parking position inputting means 20 sets the target parking position 85 (i.e., a first target parking position, or a first target position when being applied for the vehicle backward movement assist device) in response to the purposes such as the back-in parking, the parallel parking, a turnaround and so on as non-limiting examples. The position of the target parking position 85 to be displayed at the display 20 ca be modified by operating the independently provided stick key, touch key or button switch or by the touch-operation of the touch panel 80.

Figure 3:
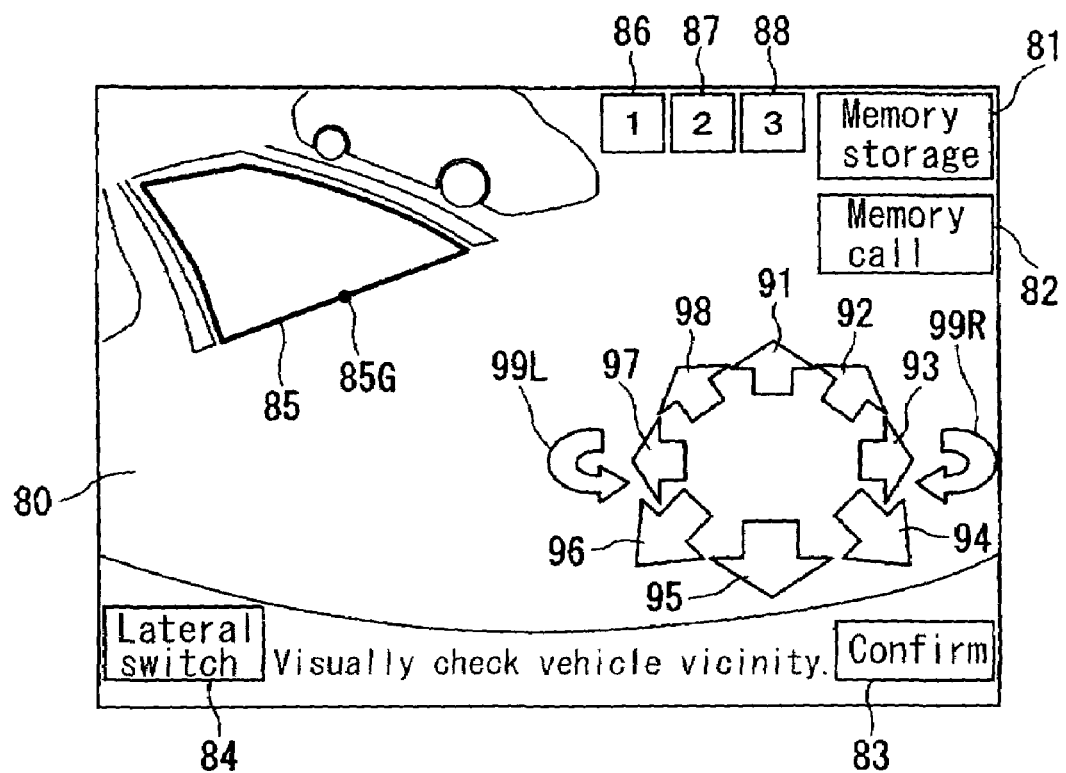
FIG. 3 is an explanatory diagram for explaining a display and a touch panel of the vehicle parking assist device.

As illustrated in FIG. 3, the touch panel 80 includes the area for setting the target parking position confirmation key 83, which is configured with a touch key, at a bottom-right portion thereof, while the touch panel 80 also includes an area for setting a lateral switching key 84, which is configured with a touch key, at a bottom-left portion thereof. The lateral switching key 84 is operated to switch a marker of a target parking position 85 to be displayed either at an upper left portion of the touch panel 80 or at an upper right portion thereof. The target parking position marker 85 is generated by projecting a target parking position at an XY plane (a two-dimensional plane) to be superimposed on the view stereo-image-picked up by the camera 1 fixed at the vehicle 100.

The touch panel 80 further includes an area for setting several keys to change the orientation of the target parking position 85 to be displayed. The several keys includes an upward indicator 91 for shifting the displayed position of the target parking position 85 upward of the display 2, an rightward indicator 93 for shifting the displayed position thereof in a right direction of the display 2, a downward indicator 95 for shifting it downward, a leftward indicator 97 for shifting it in a left direction, an upper rightward indicator 92 for shifting it in an upper-right direction, a bottom-rightward indicator 94 for shifting it in a bottom-right direction, a bottom-leftward indicator 96 for shifting it in a bottom-left direction and an upper-leftward indicator 98 for shifting it in an upper-left direction.

Further, the several keys include a rightward rotation (clockwise) indicator 99R and a leftward rotation (counterclockwise) indicator 99L. In operation of the rightward rotation indicator 99R, the orientation of the target parking portion 85 is turned with a pivot point of a base point 85G at a front of the marker of the target parking position 85. When the rightward rotation indicator 99R is continuously operated, the target parking position 85 is turned in a clockwise direction in the display 2 at 1. degree. every second. When the rightward rotation indicator 99R is intermittently operated, the target parking position 85 is turned in the clockwise direction in the display 2 at 15. degree. every intermittent operation. When the leftward rotation indicator 99L is continuously operated, the target parking position 85 is turned in a counterclockwise direction in the display 2 at 1 degree. every second. When the leftward rotation indicator 99L is intermittently operated, the target parking position marker 85 is turned in the counterclockwise direction in the display 2 at 15. degree. every intermittent operation. According to the embodiment of the present invention, the marker of the target parking position 85 is turned with the pivot point of the base point 85 G defined at a center of a front portion of the target parking position marker 85 as illustrated in FIG. 3. Alternatively, the target parking position 85 can be turned with the pivot point of the base point 85G defined either at a center of an area of the target parking position 85, at a center of a back portion thereof, or at one of the corners thereof.

At least the target parking position confirmation key 83, the upward indicator 91, the rightward indicator 93, the downward indicator 95, the leftward indicator 97, the rightward rotation indicator 99R and the leftward rotation indicator 99L are operated, e.g. pushed, for backing the target parking position 85 on the display 2. These keys serve as the target parking position inputting means 20 along with the ECU 3.

Further, the touch panel 80 includes an area for setting a memory storage key 81, which is configured with a touch key, at the top-right portion thereof. The touch panel 80 also includes an area for setting a memory call key 82 immediately below the memory storage key 81. Still further, the touch panel 80 includes an area for setting memory selecting keys 86, 87 and 88 for respectively storing the target parking positions 85 being popped out in the display 2. Each of the memory selecting keys 86, 87 and 88 can be recognized by the driver as keys 1, 2 and 3. The currently displayed target parking position 85 can be stored by operating or pushing the memory storage key 81 after selectively operating or pushing one of the memory selecting keys 86, 87 and 88. The stored target parking position 85 can be called by operating or pushing the memory call key 82 after selectively operating or pushing one of the memory selecting keys 86, 87 and 88.

A nonvolatile memory 3A imbedded in the ECU 3 has specified memory addresses corresponding to the memory storage key 81, the memory call key 82, and the memory selecting keys 86, 87 and 88. When one of the memory selecting keys 86, 87 and 88 and the memory storage key 81 are operated or pushed, the target parking position 85 is memorized in the specified memory address of the nonvolatile memory 3A. When one of the memory selecting keys 86, 87 and 88 and the memory call key 82 are operated or pushed, the target paring position 85 is called from the specified memory address of the nonvolatile memory 3A. As described above, the nonvolatile memory 3A of the ECU 3 has the plural specified memory addresses for storing information of the plural target parking positions 85. Therefore, each of the target parking positions 85 can be memorized in one of the specified memory addresses, which is selected by the driver and can be selectively called therefrom. That is, the plural memory selecting keys 86, 87 and 88, the memory storage key 81 and the memory call key 82 serve as a target parking position storing means 30 along with the involatile memory 3A of the ECU 3. The target parking position storing means 30 has the plural specified memory addresses for the information of the plural target parking positions 85, stores the target parking position 85 by selecting one of the plural specified memory addresses, and selectively calls one of the stored target parking positions 85 as needed.

Figure 2:
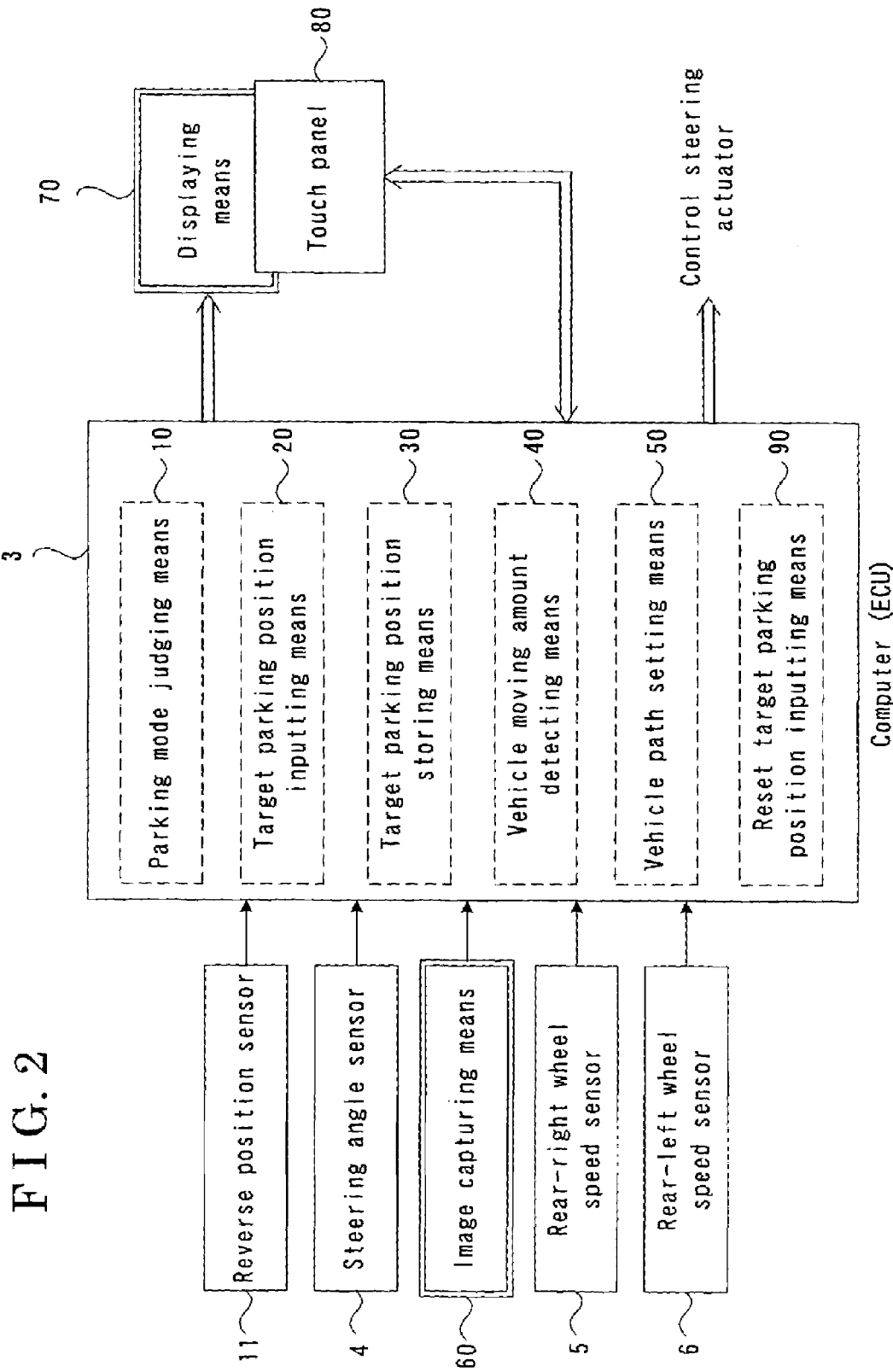
FIG. 2 is a functional block diagram illustrating a computer for the vehicle mounted with the vehicle parking assist device.

As explained in FIG. 2, the ECU 3 includes the parking mode judging means 10, the target parking position inputting means 20, the target parking position storing means 30, the vehicle moving amount detecting means 40, and a vehicle path determining means 50, and the displaying means 70. The parking mode judging means 10 judges the vehicle mode between the back-in parking mode and the parallel parking mode based upon the vehicle running locus within the predetermined distance or time immediately before the not-illustrated shift lever is shifted to the reverse range when a reverse position sensor 11 detects the backward movement of the vehicle 100. The vehicle running locus substantially corresponds to the locus of the turning angle of the steering angle sensor 4. When the turning angle of the steering angle sensor 4 is substantially equal to or less than the specified threshold angle value, the parking mode judging means 10 judges that the vehicle 100 has been under the parallel parking mode. The target parking position inputting means 20 sets the target parking position of the backing vehicle 100 under the parking mode judged by the parking mode judging means 10. The target parking position storing means 30 can store the target parking position 85, call the memorized target parking position 85. The target parking position storing means 30 can apply the called target parking position 85 for the vehicle path determining means 50. The vehicle moving amount detecting means 40 detects the movement of the vehicle 100 along with the steering angle sensor 4, the rear-right wheel speed sensor 5 and the rear-left wheel speed sensor 6. The vehicle path determining means 50 calculates a path from the vehicle postposition after the vehicle movement toward the target parking position. In general, the vehicle path determining means 50 is a microcomputer. However, as far as the vehicle path determining means 90 can repeatedly calculate the path from the vehicle current position to the target parking position every predetermined time or every predetermined distance, the vehicle path determining means 90 can be an arithmetic circuit. The displaying means 70 displays the image of the vehicle rear view photographed by the camera 1 and superimposes the target parking position 85 on the image taken by the camera 1. The displaying means 70 can superimpose the vehicle path on the display 2, which is computed by the vehicle path determining means 50 based upon the position of the target parking position 85 set by the target parking position inputting means 20. The displaying means 70 is generally a liquid crystal display or an electro luminescent display. However, as far as the displaying means 70 can display the image captured by a general image capturing means and can superimpose the target parking position set by the target parking position inputting means, the displaying means 70 is not limited to the above. That is, the target parking position set by the target parking position inputting means can be drawn by a line or a surface on a transparent background and can be superimposed on the image captured by the image capturing means. Therefore, the displaying means 70 can be a liquid crystal display or an electro luminescent display, each of which has a mixing function. Further, the displaying means 70 can be a combination of the liquid crystal display and an image mixing device or a combination of the liquid crystal display and the image mixing device.

The ECU 3 further includes a reset target parking position inputting means 90 (i.e., a reset target parking position inputting means and a reset target position inputting means) for resetting the orientation of the target parking position 85 when the vehicle path determined by the vehicle path determining means 50 is judged not to be appropriate or when the key was operated in error while the vehicle 100 is backing up. The reverse position sensor 11 according to the embodiment of the present invention detects the position of the shift lever at the reverse range. More particularly, the reverse position sensor 11 detects the shift lever at the reverse range or a transmission establishing a reverse shift stage therein.

Figure 17:
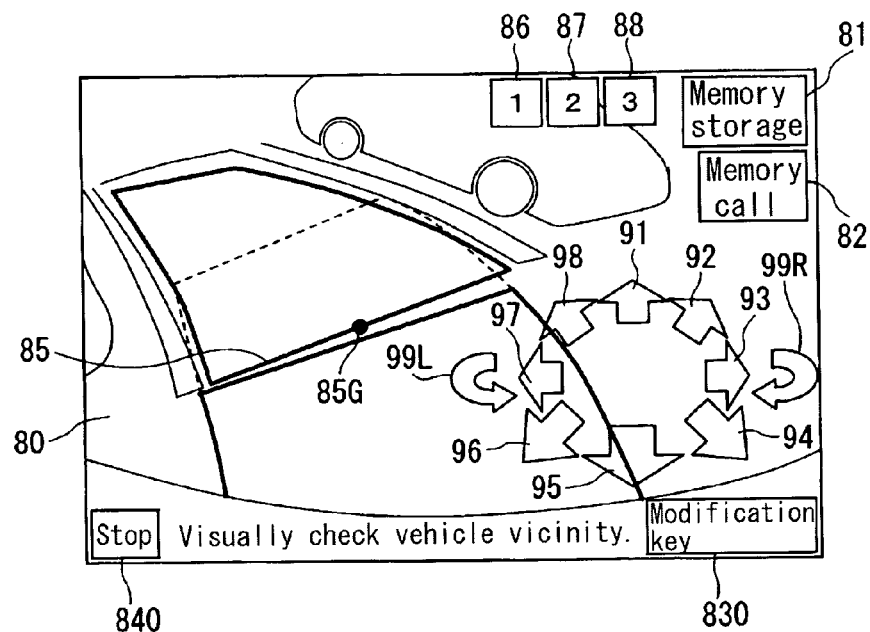
FIG. 17 is an explanatory view for explaining the back-in parking maneuver displayed at the display when the vehicle is approaching the target parking position.
Figure 18:
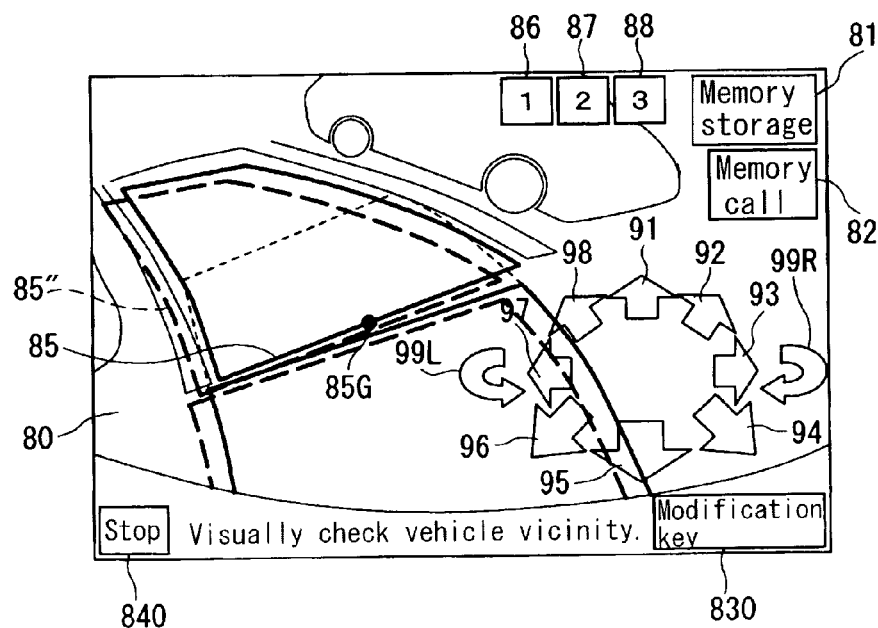
FIG. 18 is an explanatory view for explaining the back-in parking maneuver displayed at the display when the target parking position is modified while the vehicle has already approached the target parking position.

As illustrated in FIGS. 17 and 18, in response to the operation of the target parking position confirmation key 83, the target parking position confirmation key 83 is shifted to a target parking position modification key 830, and the lateral switching key 84 is shifted to a parking operation stop key 840.

Next, following explanation will be given for explaining an operation of the parking assist device according to the embodiment of the present invention with reference to the attached drawings.

Figure 4A:
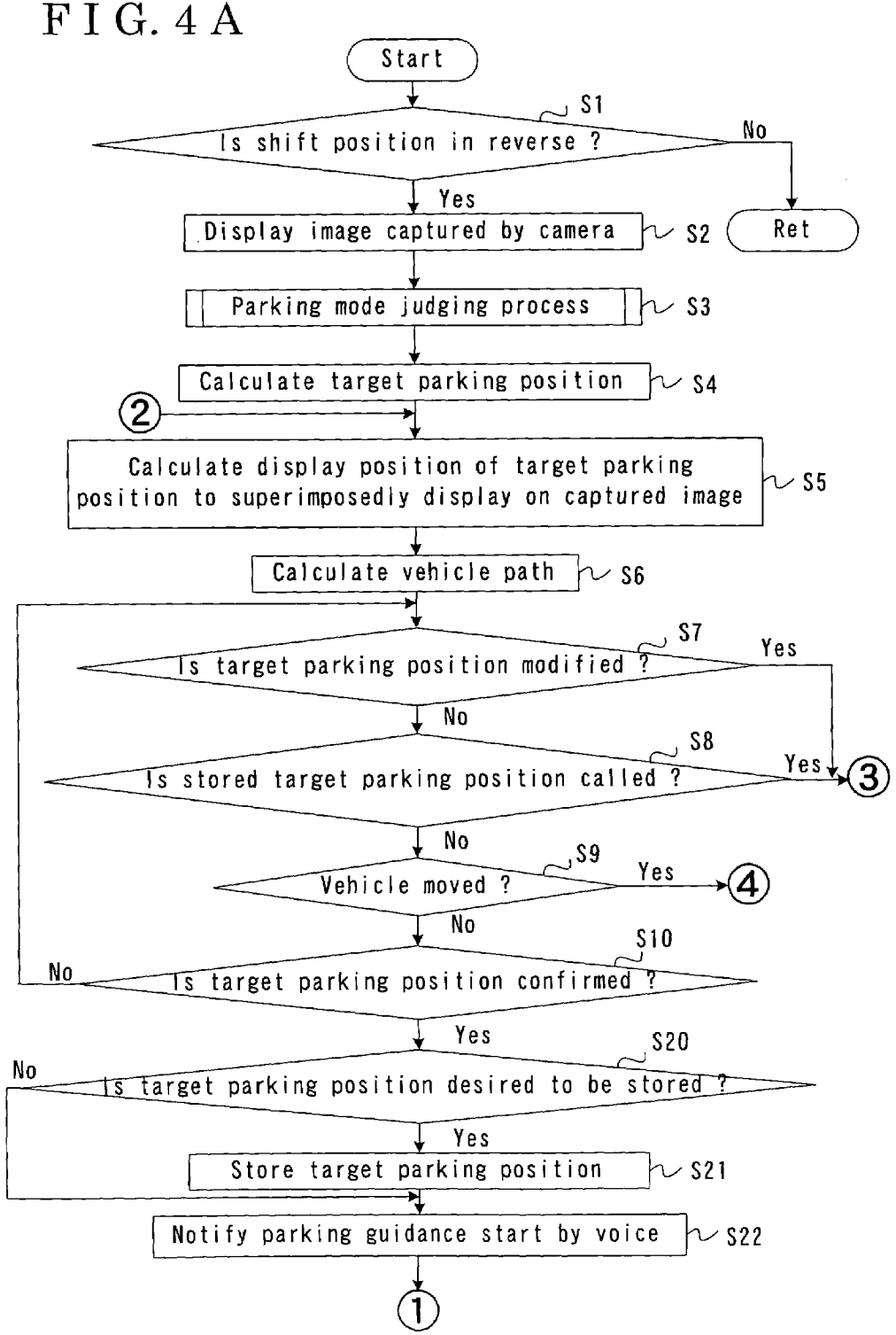
FIG. 4A is a flowchart for explaining an operation of a vehicle parking assist device according to the embodiment of the present invention.
Figure 4B:
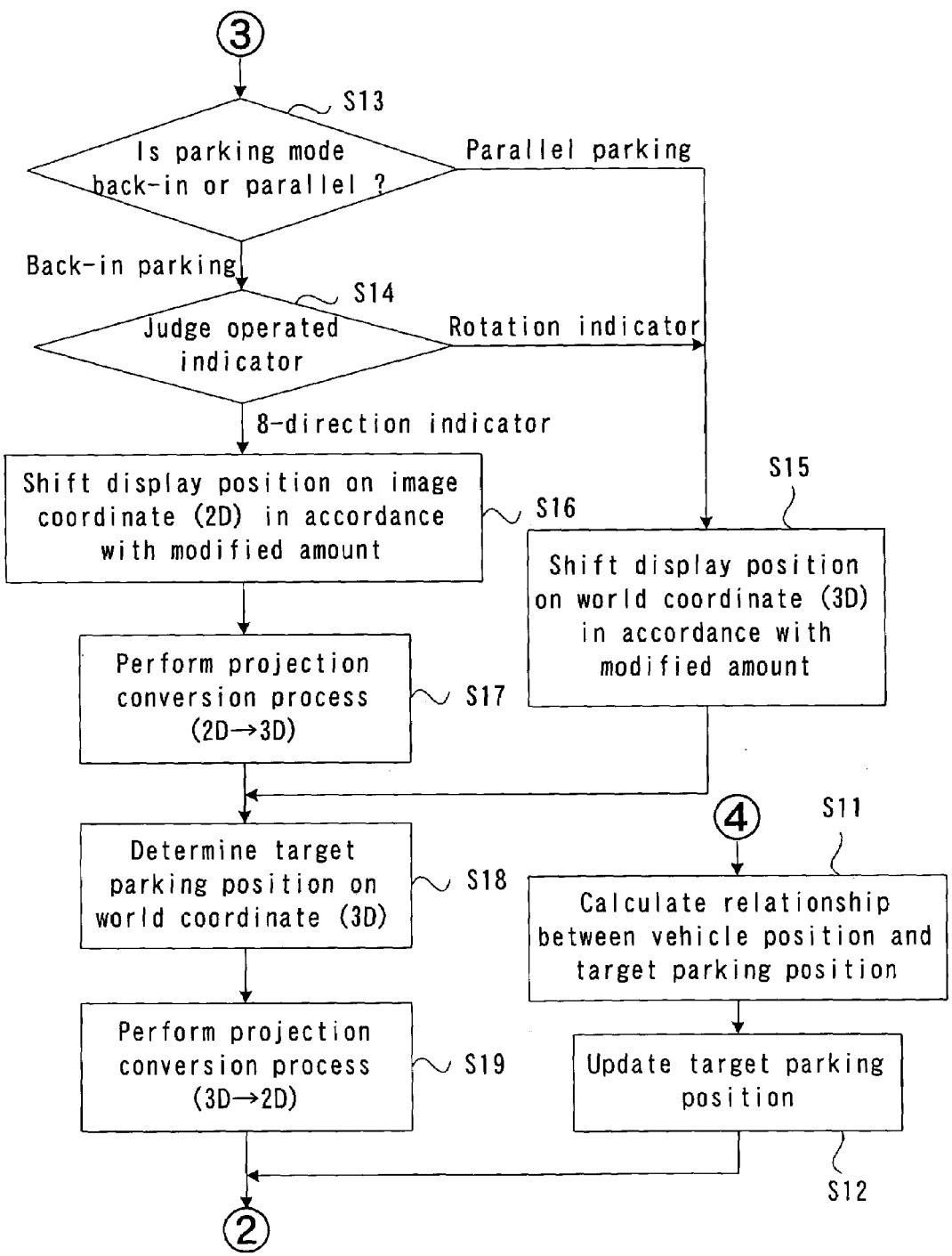
FIG. 4B is a flowchart following the flowchart of FIG. 4A.
Figure 5:
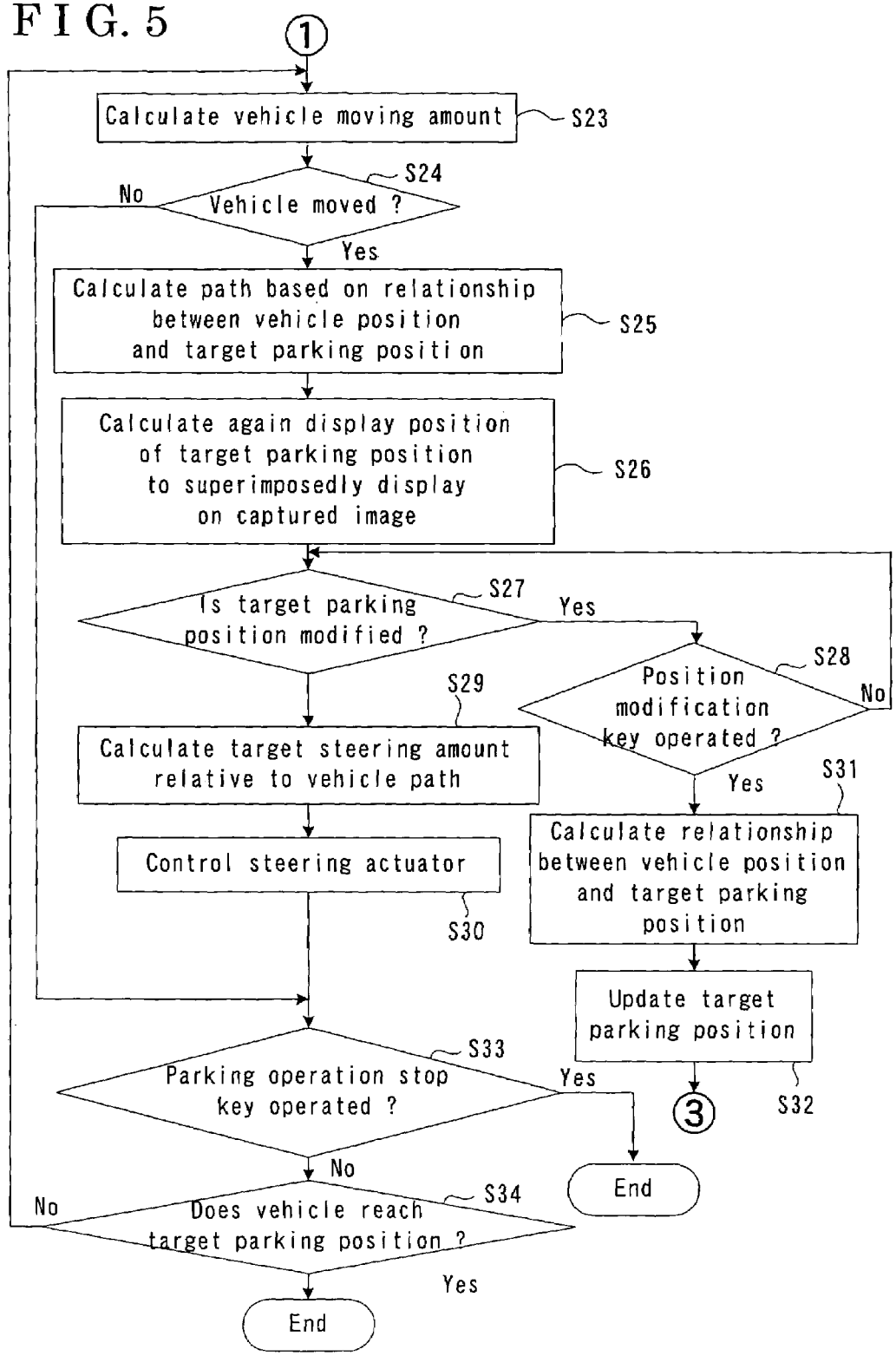
FIG. 5 is a flowchart following the flowchart illustrated in FIG. 4.

With reference to FIGS. 4A, 4B, 5 and 6, the ECU 3 judges at step S1 whether the shift lever has been shifted to the reverse range based upon the signal outputted from the reverse position sensor 11. When the shift lever is not positioned at the reverse range, this routine illustrated in FIGS. 4A and 4B is terminated and the program proceeds to other control routine. When the shift lever is judged to be positioned at the reverse range, the program proceeds to step S2, wherein the image of the vehicle rear view photographed by the camera 1 is displayed on the display 2.

Figure 6:
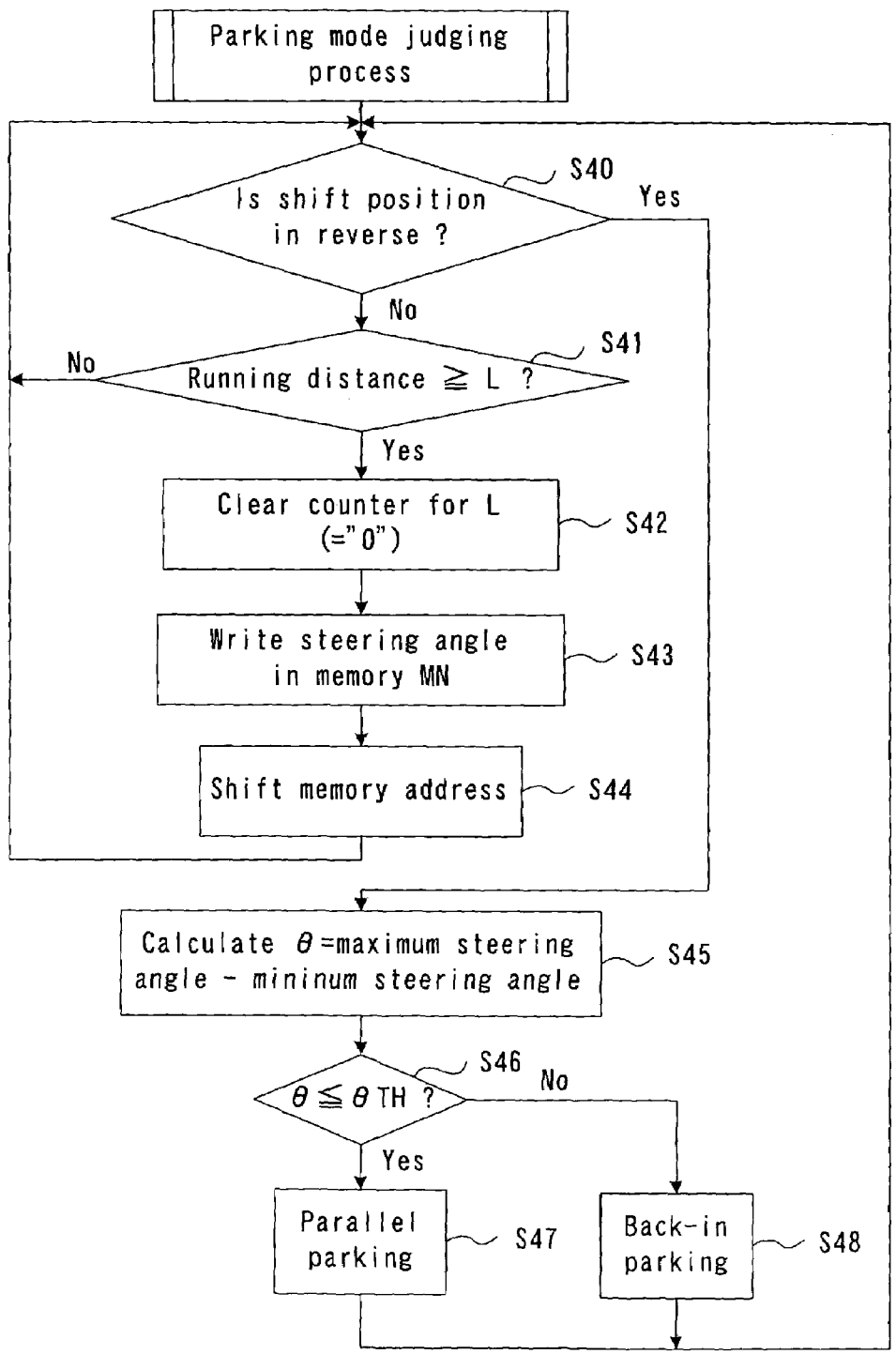
FIG. 6 is a flowchart for explaining a sub routine of a parking mode judging process performed at step S3 of the flowchart illustrated in FIG. 5.

At step S3, a sub routine for performing a parking mode judging process is called. The parking mode judging process is always carried out independently from the other control routine. As illustrated in FIG. 6, the ECU 3 judges whether the shift lever has been shifted to the reverse range based upon the signal outputted from the reverse position sensor 11. When the shift lever is judged not to be positioned at the reverse range, the process from step S40 to step S44 is repeatedly performed. At step S41, the ECU 3 judges whether a vehicle traveling amount is substantially equal to or greater than a predetermined traveling distance L. When the actual vehicle traveling amount is less than the predetermined traveling distance L, the program returns to step S40. That is, the program does not proceed to step S42 until the actual vehicle traveling amount becomes substantially equal to or greater than the predetermined traveling distance L.

At step S42, a counter for counting the actual vehicle traveling distance is cleared when the actual vehicle traveling amount becomes substantially equal to or greater than the predetermined traveling distance L. At step S43, the steering angle detected by the steering angle sensor 4 is then stored in the memory address MN. The number N represents the number of the storage ranges in the memory. At step S44, the steering angle already stored in the storage range of the memory address M1 is cleared, and each of the steering angle stored in the storage range of the memory address MN is shifted to the storage range of the memory address MN-1. That is, the oldest information of the steering angle is deleted and each of the information of the steering angle is shifted to the adjacent memory address. In general, the predetermined traveling distance L is defined within a range from 0.3 meters to 1.5 meters, inclusively. The number N is defined within a range from 10 to 50, i.e., 10 to 50 storage ranges are included in the memory. However, according to the embodiment of the present invention, the predetermined traveling distance L and the number of the storage ranges in the memory are not limited to the above.

When the shift lever is judged to be positioned at the reverse range at step S40 based upon the signal outputted from the reverse position sensor 11, the processes from step S45 to step S48 are repeatedly performed. At step S45, the ECU 3 computes an angle difference between the maximum steering angle and the minimum steering angle, both of which have been stored in the storage ranges of the memory. The computed angle difference represents the turning angle θ of the steering angle sensor 4. The steering angle is denoted with a positive value when the steering wheel 4a is turned in the right direction relative to a central position, while the steering angle is denoted with a negative value when the steering wheel 4a is turned in the left direction relative to the central position. At step S46, the ECU 3 judges whether the turning angle θ of the steering angle sensor 4 is substantially equal to or less than a predetermined threshold angle valueθTH. When the turning angleθ of the steering angle sensor 4 is substantially equal to or less than the predetermined threshold angle value θTH, the program proceeds to step S47 for setting a flag for the parallel parking mode at "1". On the other hand, when the turning angleθ of the steering angle sensor 4 is greater than the predetermined threshold angle value θTH, the program proceeds to step S48 for setting a flag for the back-in parking mode at "1".

As described above, according to the parking mode judging process illustrated in FIG. 6, the vehicle 100 is judged to have been either at the back-in parking mode or at the parallel parking mode when the shift lever is shifted to the reverse shift range. Whatever the vehicle parking mode is, the vehicle parking mode is stored by a flag for the back-in parking mode or by a flag for the parallel parking mode.

According to the embodiment of the present invention, each of the storage addresses is allocated every traveling distance L. The steering angle every traveling distance L is stored at the specified memory address MN. That is, the steering angle is stored every predetermined distance. Alternatively, the steering angle can be stored every predetermined time. However, the relationship between the vehicle traveling distance and the steering angle shows that a method of storing the steering angle every predetermined distance is more reliable than a method of storing the steering angle every predetermined time.

Figure 7:
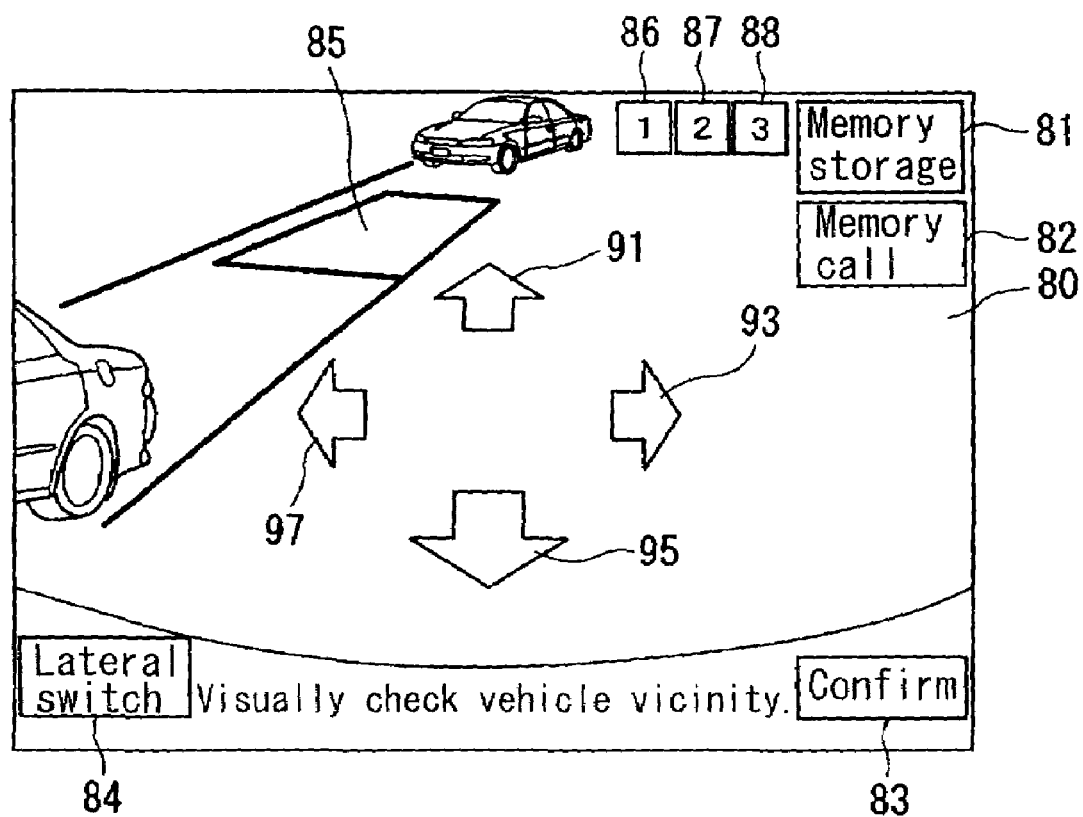
FIG. 7 is an explanatory diagram for explaining a display for the parallel parking mode according to the embodiment of the present invention.

After judging under which parking mode the vehicle 100 has currently been at the parking mode judging process at step S3, the program proceeds to step S4 for computing the target parking position 85 corresponding to the selected parking mode. The computed target parking position 85 is displayed either at the upper-right or at the upper-left corner of the display 2 as a primary and possible target parking position. Alternatively, the target parking position 85 can be determined by learning the past records of the back-in parking maneuver or the parallel parking maneuver of the driver. At step S5, the target parking position 85 is computed on an XY plane (the two-dimensional plane). However, the computed target parking position 85 is required to be superimposingly displayed on the image captured by the camera 1 set at a predetermined vehicle height (Z-axis). When the vehicle 100 is judged to have been under the back-in parking mode at step S3, the image illustrated in FIG. 3 is shown on the display 2. While the vehicle 100 is judged to have been under the parallel parking mode at step S3, the image illustrated in FIG. 7 is shown on the display 2.

An image processing of the image to be displayed on the display 2 is performed as described below.

Figure 8:
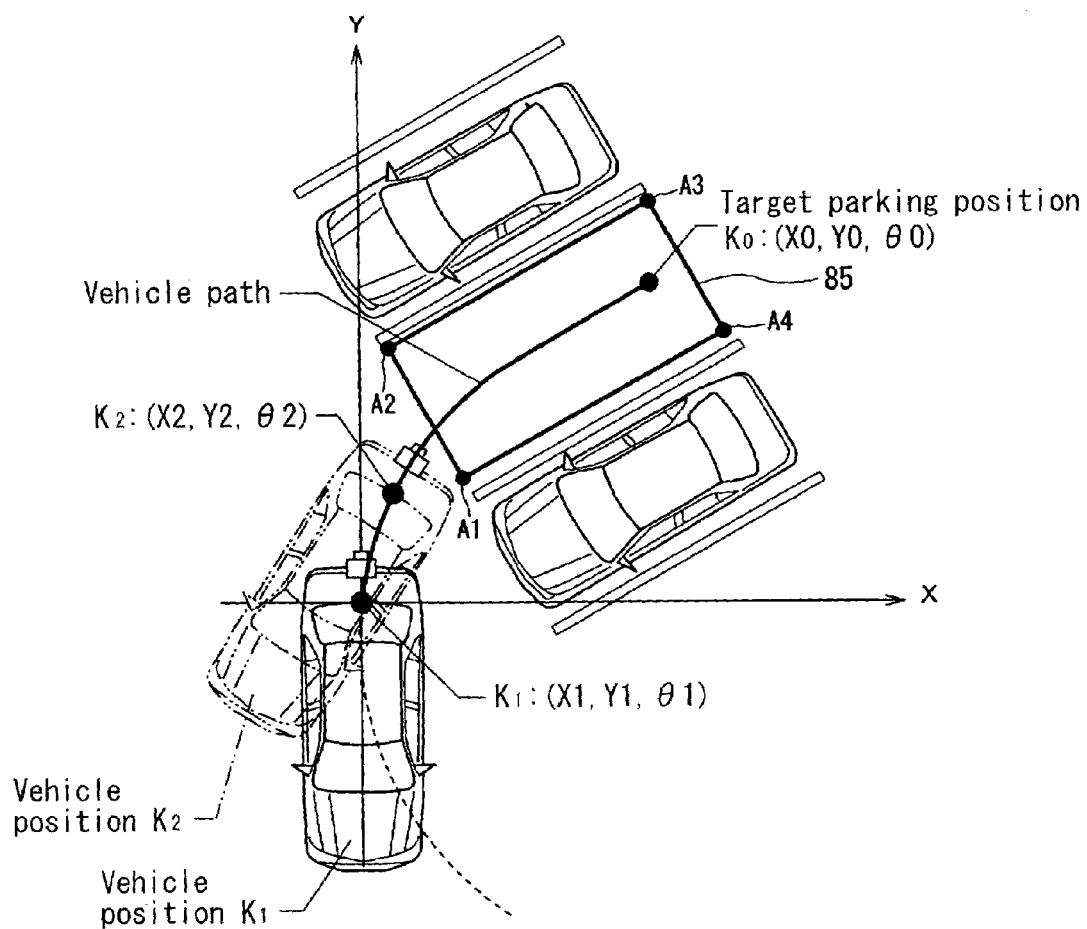
FIG. 8 is an explanatory diagram for explaining a relationship between the vehicle and the back-in parking of the vehicle parking assist device according to the embodiment of the present invention.

Counting in the size of the vehicle 100, an area of a parking space for parking the vehicle 100 is defined as illustrated in FIG. 8 with parameters such as points A1 and A4, which define a length of the parking space set on the two-dimensional coordinate, points A2 and A3, which define another length of the parking space set on the two-dimensional coordinate, the points A1 and A2, which define a front width of the parking space set on the two-dimensional coordinate, and the points A4 and A3, which define a rear width of the parking space set on the two-dimensional coordinate. A target position KO of the vehicle 100, which approaches backward, is denoted with a position (X0, Y0, θ0) set on the XY plane (the two-dimensional coordinate). A position K1 of the vehicle 100 is denoted with a position (X1, Y1, θ1) set on the XY plane (the two-dimensional coordinate). The position K1 is defined to be mapped with the target position KO. As the vehicle 100 is backing up, the position K1 is shifted to a position K2 denoted with a position (X2, Y2, θ2). The vehicle traveling path is repeatedly computed while the vehicle has traveled from the position K1 to the position K2. Although the above explanation is applied for the back-in parking mode illustrated in FIG. 8, it can be applied for the parallel parking mode.

According to the conventional image display, the above computed two-dimensional coordinate is superimposed on the image captured by the camera 2 and is displayed on the display 2 of two dimensions. As illustrated in FIG. 8, the relationship between the position of the vehicle 100 and the target parking position 85 is comprehended on the two-dimensional coordinate. However, the two-dimensional image displayed on the display 2 includes the image photographed by the camera 1 fixed at the predetermined vehicle height (Z-axis). Therefore, each position such as the vehicle position and the target parking position 85 is practically determined on a world coordinate system (X, Y, Z) of three dimensions.

Figure 9:
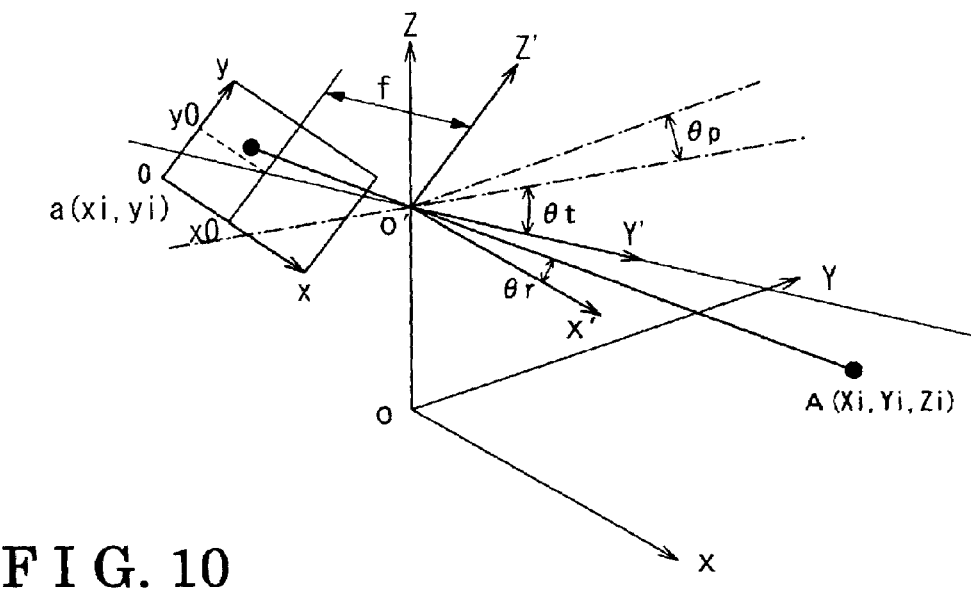
FIG. 9 is an explanatory diagram for explaining a coordinate conversion according to the embodiment of the present invention.

For example, the point A of the vehicle is denoted with a practical coordinate (Xi, Yi, Zi) which is a drawing point set on the world coordinate system of three dimensions, as illustrated in FIG. 9. Following equations are established in order to perform projection conversion of the point A denoted with the practical coordinate (Xi, Yi, Zi) to a point a denoted with a coordinate (xi, yi) of two dimensions at the display 2;

$$a = P\begin{bmatrix}A\\1\end{bmatrix}, \quad (1)$$

and $$P = C\begin{bmatrix}R\\T\end{bmatrix}. \quad (2)$$

The above formula P is a conversion matrix of 3×4 projection, the parameter C denotes an internal parameter of the camera 1, the parameter R denotes a rotation matrix, and the parameter T denotes a translation vector. An optic axis (a center line) of the camera 1 is positioned on a center point (x0, y0) on the two-dimensional image coordinate of the display 2. Therefore, as far as the world coordinate system is matched with a point (X', Y', Z') on a three-dimensional coordinate system in a Y' axis direction, the target parking position 85 can be displayed at the display 2 regardless of the Y' axis direction.

As described above, the target parking position calculated on the world coordinate system is converted into the point set on the image coordinate system of two dimensions in accordance with the equations (1) and (2). Further, the target parking position is then superimposed on the image captured by the camera 1 as a graphic drawing. The target parking position computed at step S4 is superimposed on the image of the rear view photographed by the camera 1 and is displayed on the display 2 at step S5. At step S6, the current position of the vehicle 100 is calculated at the XY plane based upon the image of the rear view captured by the camera 1, and the actual path of the vehicle 100 approaching the target parking position 85 is computed.

At step S7, the ECU 3 judges whether the driver modified the position of the target parking position 85 by operating at least one of the indicators shown on the touch panel 80 because the driver figured the necessity of the target parking position change. In practice, when any of the indicators is operated in response to the driver's judgment that the modification of the target parking position 85 is needed, the ECU 3 judges that the target parking position 85 was modified. The program then proceeds to step S13. On the other hand, when any of the indicators is not operated, the ECU 3 judges that the target parking position 85 has been stayed. The program then proceeds to step S8, wherein the ECU 3 judges whether the stored target parking position 85 was called. When the target parking poison 85 is called at step S8, the program then proceeds to step S13. On the other hand, when the target parking position 85 is not called at step S8, the program proceeds to step S9.

At step S9, the ECU 3 judges whether the vehicle 100 has moved. When an affirmative answer (YES) is obtained at step S9, the program proceeds to step S11 for calculating again the relative relationship between the current position of the vehicle 100 and the target parking position 85. At step S12, the target parking position 85 computed at step S4 is updated to a target parking position (i.e., a second target parking position, or a second target position when being applied for the vehicle backward movement assist device). The program then returns to step S5 so as to repeatedly perform the processes following step S5. On the other hand, when a negative answer (NO) is obtained at step S9, the program proceeds to step S10.

At step S10, the ECU 3 judges whether the driver operated the target parking position confirmation key 83. The driver pushes the target parking position confirmation key 83 when the target parking position 85 displayed on the display 2 is judged to be appropriate by the driver. When the operation of the target parking position confirmation key 83 is not inputted to the ECU 3, the program returns to step S7. On the other hand, when the operation of the target parking position confirmation key 83 is inputted to the ECU 3, the program proceeds to step S20.

As described above, the processes from step S6 to step S12 can be performed to change the position of the target parking position 85 to be displayed at the display 2 when the vehicle 100 is moved after calculating the vehicle path to the target parking position 85 at step S6.

Further, according to the embodiment of the present invention, when the vehicle 100 moves with no modification of the target parking position 85 at the touch panel 80 before the operation to call the target parking position 85, the path from the post position of the vehicle 100 to the target parking position 85 can be calculated again and superimposed at the display 2.

When one of the memory selecting keys 86, 87 and 88 and the memory call key 82 are operated at step S8, the program proceeds to step S13, wherein the ECU 3 judges which parking mode is applied to the target parking position 85 of the operated memory selecting key, based upon the result obtained at step S3. In this case, the ECU 3 judges which parking mode has been selected based upon a set state of the flags for the back-in parking mode and the parallel parking mode. When the flag for the back-in parking mode is set at "1", the vehicle 100 has been under the back-in parking mode.

For example, when the ECU 3 judges at step S13 that the flag for the back-in parking mode is set at "1", the program first proceeds to step S14, wherein the ECU 3 judges which indicators were operated. When at least one of the upward indicator 91, an upper-rightward indicator 92, the rightward indicator 93, the bottom-rightward indicator 94, the downward indicator 95, the bottom-leftward indicator 96, the leftward indicator 97 and the upper-leftward indicator 98 is operated by the driver, the program proceeds to step S16. On the other hand, when at least one of the rightward rotation (clockwise) indicator 99R and the leftward rotation (counterclockwise) indicator 99L is operated by the driver, the program proceeds to step S15.

At step S15, while the vehicle 100 has been under the parallel parking mode, each practical point A (Xi, Yi, Zi) of the target parking position 85 is transferred on the world coordinate system in response to the operation of the indicators, i.e., in response to an adjustment amount of the target parking position 85 moved by the operation of the indicators. At step S16, while the vehicle 100 has been under the back-in parking mode, the displayed orientation of the target parking position 85 is changed on the image coordinate system in response to the operation of the indicators, i.e., in response to an adjustment amount of the target parking position 85 moved by the operation of the indicators. The program then proceeds to step S17, wherein the target parking position set on the image coordinate system is converted to the target parking position set on the world coordinate system.

At step S18, the ECU 3 computes the modification of the target parking position 85 on the world coordinate system. At step S19, the target parking position 85 newly set on the world coordinate system at step S18 is converted to an image to be displayed at the display 2 of two dimensions and is displayed at the display 2. The program then returns to step S5 so as to repeatedly perform the routine from step S5 to step S19.

By repeatedly performing the routine to step S19, the modification of the target parking position 85 displayed at the display 2 is completed. The driver virtually confirms the modification of the target parking position 85 via the display 2 and operates the target parking position confirmation key 83 at the bottom-right portion of the touch panel 80. In this case, an affirmative answer (YES) is obtained at step S10 so that the program proceeds to step S20. At step S20, the ECU 3 judges whether the target parking position 85 was stored in the memory in response to the operation of at least one of the memory selecting keys 86, 87 and 88 and the memory storage key 81. When the target parking position 85 was not stored at step S20, the program directly proceeds to step S22 without performing the process at step S21. On the other hand, when the target parking position 85 was stored at step S20, the program proceeds to step S21, wherein the target parking position 85 is stored at one of the keys 1, 2 and 3, which is the memory address for the operated memory selecting key. Needless to say, the ECU 3 controls the set states of the flags for the back-in parking mode and the parallel parking mode.

Figure 10:
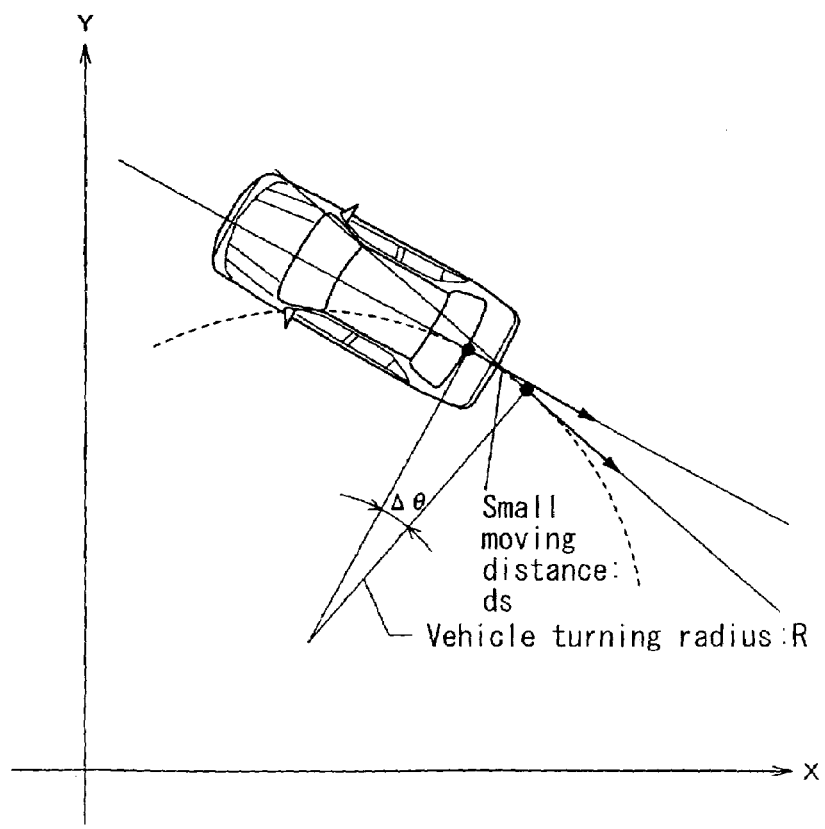
FIG. 10 is an explanatory diagram for explaining the vehicle movement upon determining the target parking position.
Figure 11:
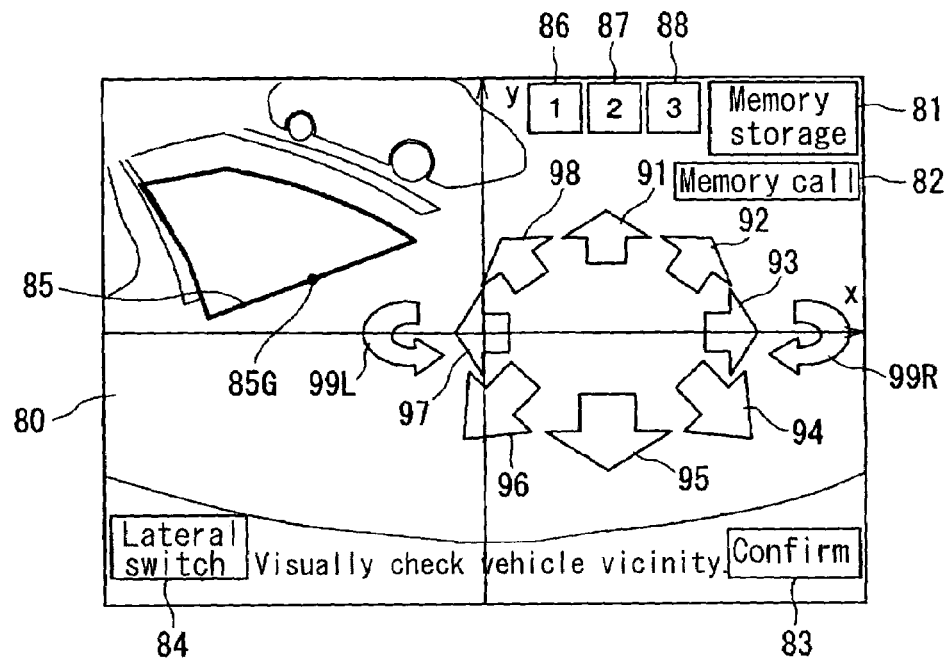
FIG. 11 is an explanatory diagram for explaining a back-in parking maneuver displayed at the display before modifying a position of the target parking position according to the embodiment of the present invention.
Figure 12:
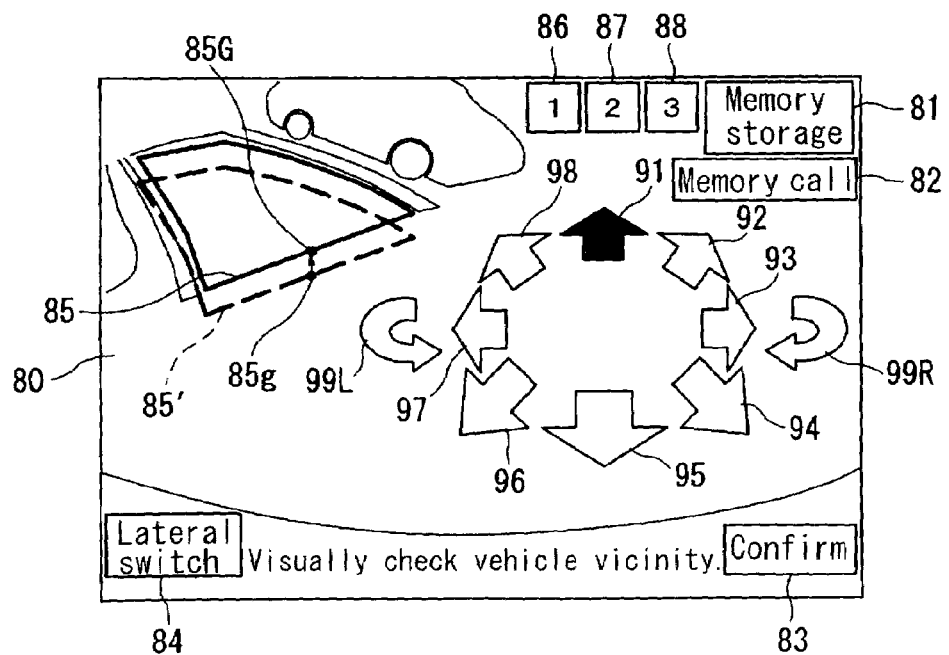
FIG. 12 is an explanatory diagram for explaining the back-in parking maneuver displayed at the display after modifying the position of the target parking position according to the embodiment of the present invention.

When the target parking position 85 was not stored at step S20, or when the target parking position 85 was memorized at step S21, the program proceeds to step S22. At step S22, the driver is guided to perform the parking maneuver by a voice guiding service (i.e., a vehicle guiding assisting means). At step S23, the ECU 3 computes the moving amount of the vehicle 100 based upon the signals from the steering angle sensor 4, the rear-right wheel speed sensor 5 and the rear-left wheel speed sensor 6. The moving amount of the vehicle 100 is calculated in accordance with the following equations based upon the two-dimensional definitions explained in FIGS. 8 and 10;

$$\theta = \int_0^a \frac{1}{R} \cdot ds, \quad (3)$$

$$X = \int_0^a \sin\theta \cdot ds \quad (4)$$

and $$Z = \int_0^a \cos\theta \cdot ds. \quad (5)$$

The arithmetic operator ds denotes a small distance and is evaluated based upon the tire turning amount detected by the rear-right wheel speed sensor 5 and the rear-left wheel speed sensor 6. The parameter R denotes a vehicle turning radius R of the vehicle 100 and is evaluated based upon the value of the steering angle sensor 4. The parameter a denotes a accumulative vehicle moving distance from the vehicle start point of the vehicle parking maneuver. At step S24, the ECU 3 judges whether the vehicle moving amount has changed at step S23. When the vehicle moving amount has not changed, the program proceeds to step S33, wherein the ECU 3 judges whether the parking operation stop key 840 was operated. When the parking operation stop key 840 was not operated at step S33, the program proceeds to step S34, wherein the ECU 3 judges whether the vehicle 100 has arrived at the target parking position 85 displayed at the display 2. When the vehicle 100 has not arrived at the target parking position 85 yet, the program returns to step S23.

When the vehicle moving amount has changed at step S24, the program proceeds to step S25, wherein the relationship between the post position of the vehicle 100 and the target parking position 85 is computed on the world coordinate system as illustrated in FIG. 8. That is, at step S25, the vehicle path from the post position of the vehicle 100 to the target parking position 85 is determined. At step S26, the target parking position 85 (i.e., a third target parking position) is computed again and is superimposed on the image captured by the camera 1. In this case, the previous target parking position 85 and the modified target parking position 85 can be displayed at the display 2 together by changing at least one of the illustrating methods of the target parking position 85 such as a color, a shape, or a dot, if needed. Each of the color, the shape or the dot is used for the line defining the shape of the target parking position 85 or for the area defining the size of the target parking position 85. Therefore, the driver can recognize and be aware of the modified portion at the display 2 very easily.

At step S27, the ECU 3 judges whether the driver modified the position of the target parking position 85 by operating at least one of the indicators shown on the touch panel 80 because the driver figured the necessity of the target parking position change. When the ECU 3 judges that the driver modified the position of the target parking position 85 by operating at least one of the indicators shown on the touch panel 80 at step S27, the program proceeds to step S28, wherein the ECU 3 judges whether the target parking position modification key 830 was operate. When an affirmative answer (YES) is obtained at step S28, the program proceeds to step S31 for calculating the relationship between the vehicle position and the target parking position 85. At step S32, the ECU 3 updates the target parking position 85 set at step S4 to a target parking position (i.e., a fourth target parking position). The program then returns to step S13. When the parking operation stop key 840 was operated at step S33, the vehicle-parking guide is once terminated.

At this point, the relationship between the image displayed at the display 2 and the back-in parking mode or the relationship between the image displayed at the display 2 and the parallel parking mode are explained with reference to FIGS. 11 through 18, respectively.

With reference to FIGS. 17 and 18, when the target parking position confirmation key 83 is operated at step S10, the target parking position confirmation key 83 at the touch panel 80 is shifted to the target parking position modification key 830, while the lateral switching key 84 is shifted to the parking operation stop key 840. According to the embodiment of the present invention, the target parking position confirmation key 83 is shifted to the target operation stop key 840. Alternatively, the target parking position confirmation key 83 can be displayed as it is at the display 2 even after the modification of the position of the target parking position 85.

Figure 13:
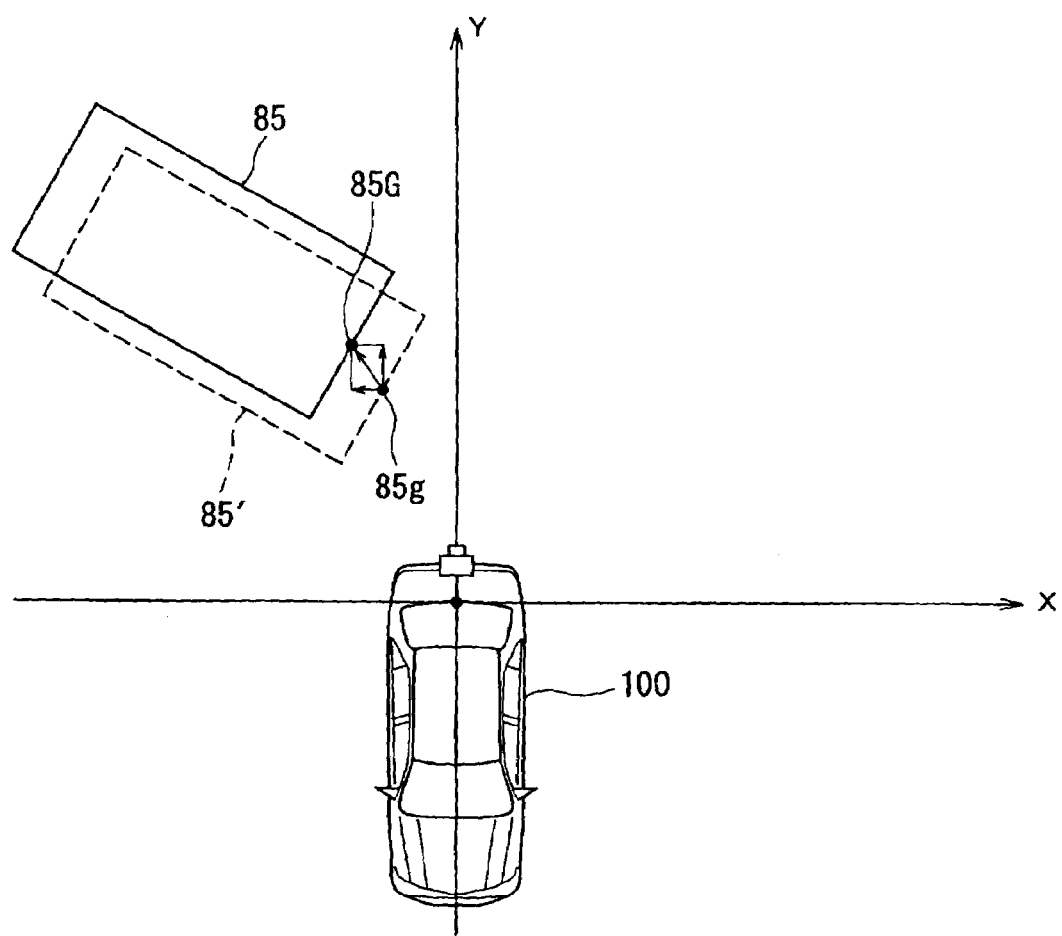
FIG. 13 is an XY plane of two dimensions for explaining the modification of a position the target parking position in a certain direction in relation to the back-in parking maneuver illustrated in FIGS. 11 and 12.
Figure 14:
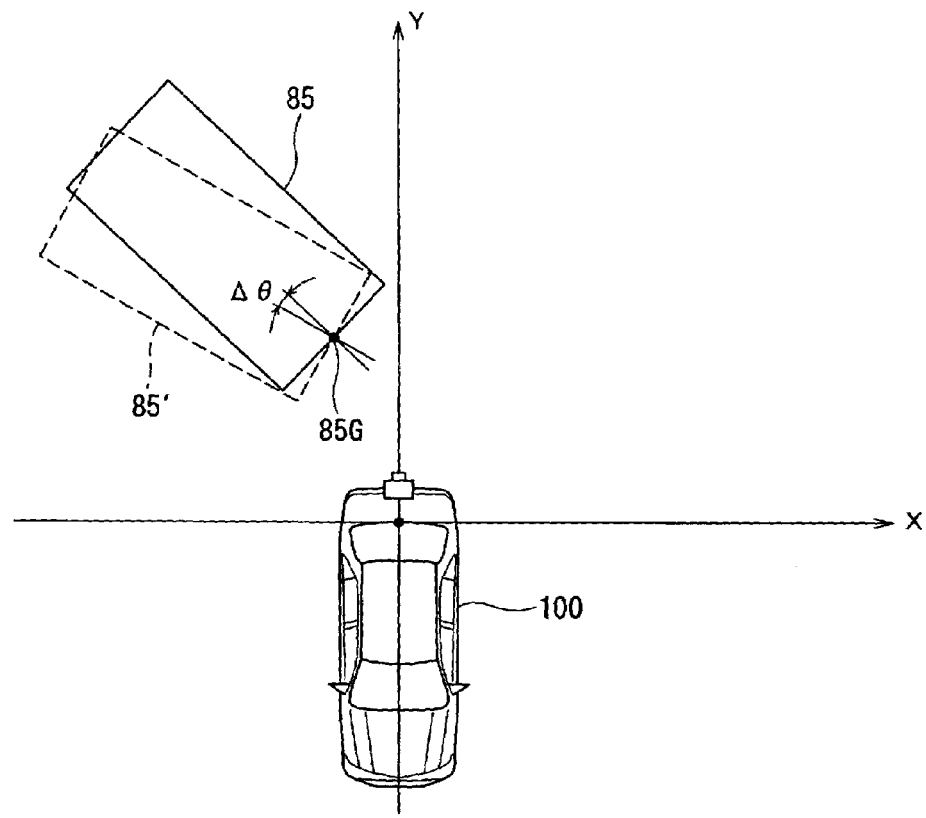
FIG. 14 is an XY plane of two dimensions for explaining a modification of a turning position of the target parking position with a pivot point of a base point.

For example, when the target parking position 85 at the touch panel 80 is displayed downward of a parking space captured by the camera 1, the target parking position 85 is required to be moved upward in the display 2. In this case, the upward indicator 91 at the touch panel 80 is operated. Therefore, the target parking position 85, which can be backed up on the image coordinate of two dimensions, is moved up to a new parking position from the marker of the previous target parking position 85'. The aforementioned upward movement of the target parking position 85 is operated on the image coordinate system of two dimensions. Meanwhile, on the world coordinate system illustrated in FIG. 13, the vehicle 100 is moved rearward and leftward on the flat area of the parking space. In practice, the target parking position 85 is set at a position to which the vehicle 100 illustrated in FIG. 13 is moved rearward and leftward.

Further, when at least one of the rightward rotation indicator 99R and the leftward rotation indicator 99L is operated, the orientation of the target parking position 85 is changed with the rotation center point of the base point 85G defined at the center of the front portion of the target parking position 85.

The upward movement of the past target parking position 85' to the target parking position 85 substantially corresponds to the upward movement of the based point 85G of the past target parking position 85'. Therefore, the position of the target parking potion 85 can be computed and recognized only by calculating the position of the base point 85G, according to the embodiment of the present invention.

Figure 15:
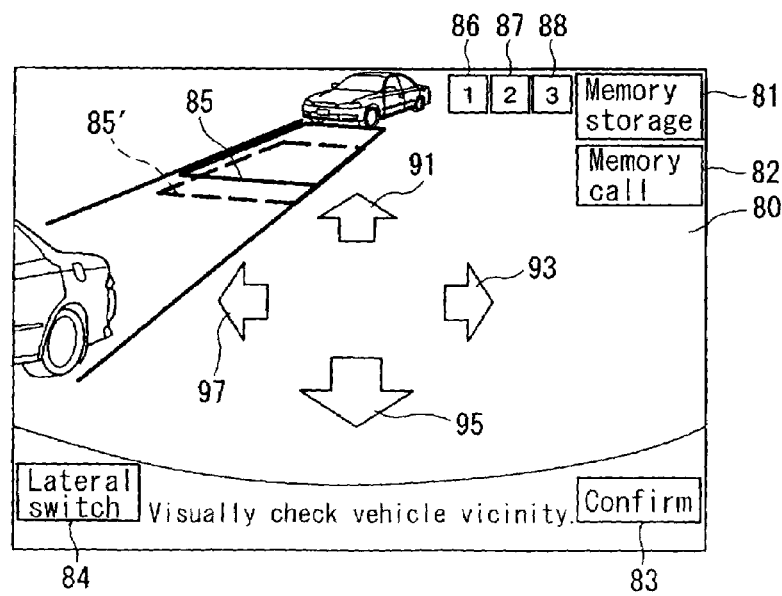
FIG. 15 is an explanatory diagram for explaining the parallel parking maneuver displayed at the display after modifying the position of the target parking position in a certain direction according to the embodiment of the present invention.
Figure 16:
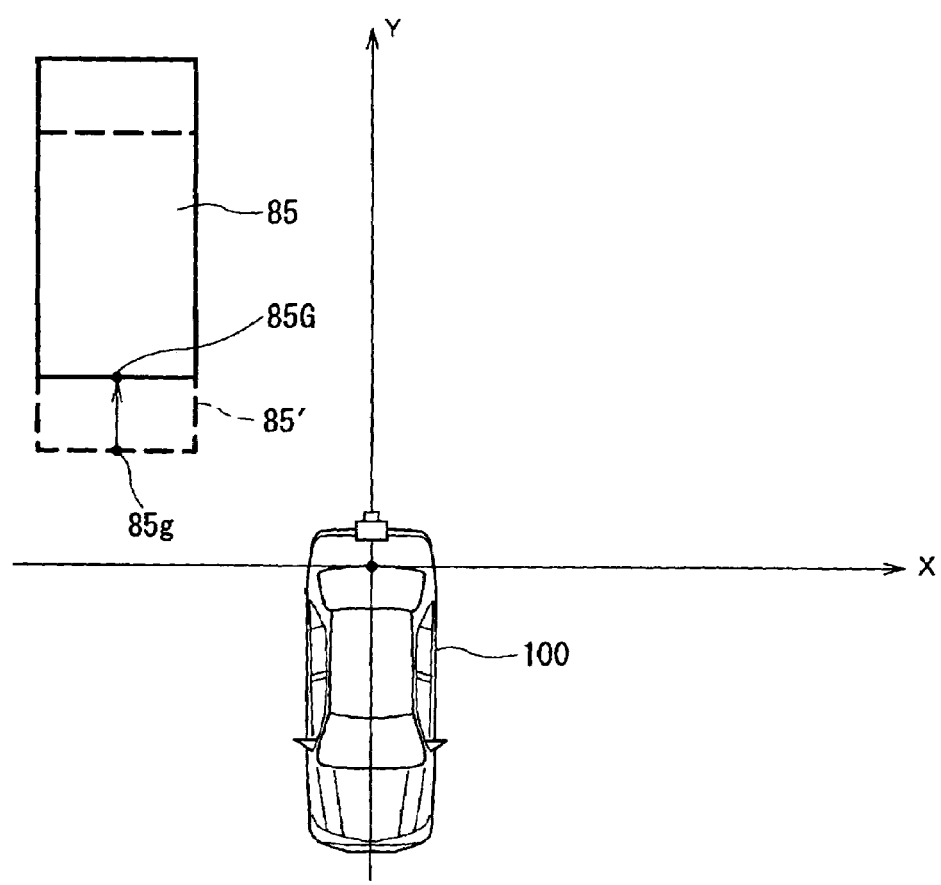
FIG. 16 is an XY plane of two dimensions for explaining the modification of the target paring position in relation to the parallel parking maneuver illustrated in FIG. 15.

As illustrated in FIG. 15, upon the parallel parking maneuver, the display 2 shows only the upward indicator 91, the rightward indicator 93, the downward indicator 95 and the leftward indicator 97. When the target parking position 85' is positioned frontward of the actual parking space captured by the camera 1, the driver operates the upward indicator 91. In this case, the target parking position 85' can be moved up to a new position. Further, by operating the upward indicator 91 and the rightward indicator 93, the display 2 can display the expected (correct) target parking position 85. As described above, the target parking position 85' is moved upward on the display 2 of two-dimensions. However, on the world coordinate system, the vehicle 100 is moved rearward on the flat area of the parking space. In practice, the target parking position 85 is defined at a position to which the vehicle 100 is moved rearward on the XY plane illustrated in FIG. 16.

Regarding the back-in parking mode of the vehicle 100 according to the embodiment of the present invention, the target parking position 85 is displayed on a large scale immediately before the vehicle 100 arrives at the target parking position 85. In this case, a problem such as the nonoperation of the target parking position confirmation key 83 may occur. This sort of problem can be estimated by the displayed vehicle running path. In this case, it is preferable that the position of the target parking position 85 is modified by the driver's operation of at least one of the indicators displayed at the display 2. The modification of the position of the target parking position 85 is completed by operating the target parking position modification key 830. FIG. 17 shows the image of the target parking position 85 which should be reset. When the target parking position 85 is required to be modified, the aforementioned target parking position modification key 830 is operated. FIG. 18 shows the target parking position 85", and the target parking position 85. The target parking position 85" has been displayed at the display 2 from an earlier stage than the target parking position 85. The previous target parking position 85" and the modified target parking position 85 can be displayed at the display 2 together by changing at least one of the illustrating methods of the target parking position 85 such as the color, the shape, or the dot used for the previous target parking position 85", if needed. In this case, the driver can recognize and be aware of the modified portion at the display 2 very easily.

As described above, according to the embodiment of the present invention, the target parking position 85 can be reset in response to the increase of the scale of the displayed target parking position 85 (relative to the current vehicle position) that has been superimposed on the image photographed by the camera 1 when the driver figures the necessity of the target parking position change. At this point, the vehicle 100 is approaching the target parking position 85 already displayed at the display 2. In this case, when the vehicle 100 is guided only by the image at the display 2 and/or by the voice guiding service (i.e., the vehicle guiding assisting means), the driver can ignore these guiding services and can operate the steering wheel towards the target parking position 85. However, once the target parking position 85 is reset, more accurate and reliable automatic steering control can be effectively performed.

As described above, according to the embodiment of the present invention, the vehicle backward movement assist device includes the image capturing means 60 of which one type is the camera 1 capturing the image of the rear view from the vehicle 100, the parking mode judging means 10 for determining the backing vehicle state between the back-in parking mode and the parallel parking mode at step S3 (through steps S40 to S48), the target parking position inputting means 20 for setting the target parking position 85 at step S4, the target parking position storing means 30 for storing the target parking potion 85 as needed and for calling the stored target parking position 85, the target parking position storing means 30 being performed at steps S8, S20 and S21, the vehicle moving amount detecting means 40 for detecting the vehicle movement and performed at step S23, the vehicle path determining means 50 for repeatedly computing the path from the vehicle current position to the target parking position 85 and performed at steps S6 and S11, and the displaying means 70 for displaying the image of the rear view from the vehicle 100 and for superimposing the target parking position 85 determined by the target parking position storing means 30 on the displayed image, the displaying means 70 further superimposing the path from the vehicle post position to the target parking position 85 on the displayed image and displaying the target parking position 85 so as to guide the vehicle 100 to the target parking position 85. The displaying means 70 is performed at steps S5 through S34.

Further, according to the embodiment of the present invention, the vehicle backward movement assist device includes the reset target parking position inputting means 90 for resetting the target parking position 85 set by the target parking position inputting means 20 when the target parking position 85 does not substantially correspond to the vehicle traveling path displayed at the display 2. The reset target parking position inputting means 90 is performed at steps S27, S28, S31 and S32.

As described above, the parking mode judging means 10 judges the parking mode of the vehicle 100 either at the back-in parking mode, the parallel parking mode and the turning around mode. The vehicle path setting means 50 repeatedly computes the vehicle path based upon the target parking position 85 set by the target parking position inputting means 20. More particularly, the vehicle path setting means 50 computes the path from the current position of the vehicle 100, which has moved at the moving amount detected by the vehicle moving amount detecting means 40, to the target parking position 85 every predetermined time in response to the vehicle movement. Substantially concurrently, the displaying means 70 displays the image photographed by the image capturing means 60 on the display 2, superimposes the target parking position 85 set by the target parking position inputting means 20 on the image and guides the vehicle 100 along the vehicle path to the target parking position 85. In this case, the more the vehicle backs up, the shorter the distance between the vehicle position and the target parking position 85 becomes. Therefore, the size of the displayed image captured by the image capturing means 60 as the camera 1 is gradually enlarged. In this case, the displayed image includes the target parking position 85. Further, the vehicle traveling path can be displayed to be matched with the image of which displayed size has been gradually enlarged, if needed. Therefore, the reliability of the vehicle guiding can be effectively improved by preventing a trouble in advance, because the driver can find an obstacle around the backing-up vehicle 100.

When the vehicle 100 is parked at a private parking space or at a company's parking space, the vehicle 100 is usually backed up from an identical parking start position to a target parking space. In this case, the target parking position 85 is prestored at the target parking position storing means 30.

The prestored target parking position 85 is called when it is needed and is employed for repeatedly computing the path from the current position of the vehicle 100, which has moved based upon the moving amount detected by the vehicle moving amount detecting means 40, to the target parking position 85. Substantially concurrently, the displaying means 70 displays the image photographed by the image capturing means 60 on the display 2, superimposed the target parking position 85 stored by the target parking position storing means 30 on the image and guides the vehicle 100 along the vehicle path to the target parking position 85. As described above, even at a limited space such as the private parking space and the company's parking space, the distance between the vehicle position and the target parking position 85 can be shorted in response to the vehicle movement so that the size of the displayed image captured by the image capturing means 60 as the camera 1 can be gradually enlarged. In this case, the displayed image includes the target parking position 85. Further, the vehicle traveling path can be displayed to be matched or synchronized with the image of which displayed size has been gradually enlarged, if needed. Therefore, the reliability of the vehicle guiding can be effectively improved.

When the shift lever (not shown) is shifted to the reverse range, the target parking position 85 is superimposed on the image captured by the camera 1 at the display 2. The target parking position 85 has substantially the same size as the vehicle 100 on the world coordinate system. The displayed position of the target parking position 85 is determined by projection-converting from the world coordinate system to the image coordinate system. On the display 2, the target parking position 85 is positioned based upon the initially set position or the called target parking position 85 by operating at least one of the indicators so that the driver can position the target parking position 85 approximately at the actual parking space captured by the camera 1. However, the target parking position 85 is positioned at the display 2 by the driver's manual operation inside the vehicle as described above. In this case, there is a possibility of a human error for some reasons. In light of foregoing, the displayed position of the target parking position 85 can be adjusted by operating at least one of the indicators at the display 2. Especially, when the vehicle 100 is parked from the identical parking start position, the target parking position 85, which was employed before and has been stored at the memory address, can be called. Therefore, the operations by the parking assist device according to the embodiment of the present invention can become fewer. Further, the driver can maneuver the parking assist device much easier. When the displayed path is judged not to be appropriate while the vehicle 100 is backing up, the target parking position 85 can be reset by the reset target parking position inputting means 90 at steps S27, S28, S31 and S32. That is, when the drive finds out defect in the displayed path, the target parking position can be easily reset. The reset target parking position inputting means 90 sets the target parking position at this point as an initial target parking position. Therefore, the target parking position can be easily modified again, and the target parking position can be displayed at an appropriate position, thereby improving the reliability of the vehicle parking assist.

Especially, the target parking position storing means 30 has plural memory addresses (regions) corresponding to the respective target parking positions 85. Each of the stored target parking positions 85 can be selectively called as needed. Therefore, the fewer operation of the vehicle backward movement assist device can be performed by selectively calling the target parking position 85 under the parking condition that the parking maneuver is carried out from the identical parking start position or to the identical parking start position at a certain parking space such as the private parking space, the company's parking space. In the same manner, the fewer operation of the vehicle backward movement assist device can be performed if plural target parking spaces corresponding to plural parking spaces at a certain place such as a super market are prestored. Because the appropriate target parking position 84 can be selectively called among the stored target parking positions 85.

According to the embodiment of the present invention, the target parking position 85, which can be stored at the nonvolatile memory 3A, can be learned and set at an initial set value within a predetermined range, which can be highly adopted in accordance with a probability distribution. Therefore, the target parking position 85 can be set corresponding to the driver's driving characteristics.

In the vehicle backward movement assist device according to the embodiment of the present invention, the ECU 3 computes a target steering amount relative to the path at step S29. At step S30, the ECU 3 controls a steering actuator. At step S34, the ECU 3 judges whether the vehicle 100 has arrived at the target parking position 85. That is, the vehicle backward movement assist device can automate the vehicle backward movement guiding assist. However, in order to achieve the present invention, the vehicle backward movement assist device can perform the vehicle backward movement guiding assist only by the image at the display 2, by a combination of this image guiding service and the voice guiding service or by a combination of this image guiding service, this voice guiding service and the vehicle backward movement automatic controlling service (i.e., the vehicle guiding assisting means).

In the vehicle backward movement assist device according to the embodiment of the present invention, the target parking position 85 stored by the target parking position storing means 30 is employed by the vehicle path determining means 50. In order to achieve the present invention, any of the parking mode judging means 10 and the target parking position storing means 30 or both of them can be omitted.

In the vehicle backward movement assist device according to the embodiment of the present invention, when the path updating operation is disabled while the vehicle 100 is backing up along the computed path, it is preferable that the ECU 3 includes a path determination judging means capable of alert the driver the disabled path updating operation. The driver can be alerted, for example when the vehicle 100 deviates from the guiding path during the voice or image guiding service. In this case, the driver can be aware of the vehicle 100 deviating from the set path and can adjust the vehicle backing-up maneuver at an early stage.

Further, in the vehicle backward movement assist device according to the embodiment of the present invention, at step S30, the steering operation can be controlled along the computed path by a steering controlling means in the ECU 3, thereby enabling the automation of the vehicle driving guiding assist. That is, since the path from the vehicle current position to the target parking position 85 has been already computed, the steering control can be performed in response to the computed path. Therefore, the vehicle backward movement assist can be performed by the steering control without being limited to the image guiding service and the voice guiding service.

According to the embodiment of the present invention, the size of the target parking position 85 becomes substantially the same as the image captured by the image capturing means while the vehicle is backing up. Therefore, if the target parking position 85 is reset at this point, the target parking position 85 can be determined accurately. Further, the resetting is not so troublesome.

Further, according to the embodiment of the present invention, the above description can be applied to the parking assist device capable of assisting the vehicle parking maneuver such as the back-in parking maneuver and the parallel parking maneuver. However, the above description is not limited to the parking assist device and can be applied to the vehicle backward movement assist device for a vehicle turning around at tight and restrictive space such as a three-forked road or backing up in a straight line. In light of a functional approach, the parking assist device is substantially equivalent to the vehicle backward movement assist device. Only in light of a usage approach, the parking assist device may be different from the vehicle backward movement assist device.

The principles, the preferred embodiment and mode of operation of the present invention have been described in the foregoing specification. However, the invention which is intended to be protected is not to be construed as limited to the particular embodiment disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A vehicle backward movement assist device comprising:
    an image capturing means for capturing an image of a rear view from a vehicle;
    a target position inputting means for setting a first target position of the vehicle;
    a vehicle moving amount detecting means for detecting a moving amount of the vehicle;
    a vehicle path determining means for determining a path from a current position of the vehicle, which moved at the moving amount detected by the vehicle moving amount detecting means to the first target position, the vehicle path determining means determining the path by repeatedly calculating the path; and
    when the vehicle moving amount detecting means does not detect a moving amount of the vehicle, a displaying means for displaying the image of the rear view from the vehicle and superimposing the first target position of the vehicle on the image of the rear view from the vehicle, and when the vehicle moving amount detecting means detects a moving amount of the vehicle, the displaying means capable of displaying the image of the rear view from the vehicle and superimposing a second target position of the vehicle on the image of the rear view from the vehicle, the second target position shifted from the first target position based upon the moving amount of the vehicle.

2. A vehicle backward movement assist device according to claim 1, wherein, when the vehicle moving amount detecting means detects a moving amount of the vehicle before setting the first target position by the target position inputting means, the displaying means displays the image of the rear view from the vehicle and superimposes the second target position of the vehicle which moved based upon the first target position and the moving amount of the vehicle.

3. A vehicle backward movement assist device according to claim 1 further comprising;
    a vehicle guiding assisting means for assisting guiding the vehicle to the first or second target position along the path determined between the current position of the vehicle and the first or second target position by the vehicle path determining means.

4. A vehicle backward movement assist device according to claim 3, wherein the displaying means displays the image of the rear view from the vehicle and superimposes the first or second target position of the vehicle moved based upon the first or second target position and the detected moving amount on the image of the rear view from the vehicle while the vehicle guiding assisting means guides the vehicle to the first or second target position.

5. A vehicle backward movement assist device according to claim 1 further comprising:
    a reset target position inputting means for resetting the first or second target position set by the target position inputting means.

6. A vehicle backward movement assist device according to claim 1 further comprising:
    a steering controlling means for controlling a vehicle steering operation along the path determined by the vehicle path determining means.

7. A vehicle backward movement assist device according to claim 1 further comprising:
    a path determination judging means for alerting a driver that the vehicle path determining means is disabled, when a path of the vehicle is not determined any more while the vehicle is moving along the path determined by the vehicle path determining means.

8. A vehicle backward movement assist device according to claim 1, wherein the first and second target positions of the vehicle are a target parking position of the vehicle.

9. A vehicle backward movement assist device according to claim 3 further comprising:
    a steering controlling means for controlling a vehicle steering operation along the path determined by the vehicle path determining means.

10. A vehicle backward movement assist device according to claim 3 further comprising:
    a path determination judging means for alerting a driver that the vehicle path determining means is disabled, when a path of the vehicle is not determined any more while the vehicle is moving along the path determined by the vehicle path determining means.

11. A vehicle backward movement assist device according to claim 1, wherein the target position inputting means includes a combination of a target position confirmation key and at least one of plural indicators operated by a driver so as to move a position of the first or second target position on the image.

12. A vehicle backward movement assist device according to claim 1 further comprising:
    a controlling means for controlling the vehicle backward movement, the controlling means including at least one of the target position inputting means, the vehicle moving amount detecting means, the vehicle path determining means, the displaying means.

13. A vehicle backward movement assist device according to claim 12, wherein the controlling means resets the first or second target position set by the target position inputting means when the path determined by the vehicle path determining means is judged not to be appropriate while the vehicle 1 moves backward.

14. A vehicle backward movement assist device according to claim 1, wherein the first target position is modified to the second target position when the vehicle moves after determining the path by the vehicle path determining means.

15. A vehicle backward movement assist device according to claim 1, wherein the second target position is substantially the same as the first target position if the vehicle does not move after determining the path by the vehicle path determining means.

16. A vehicle backward movement assist device comprising:
 a camera fixed at a portion of a vehicle so as to capture a rear view from the vehicle;
 a target position confirmation key adjusted to set a first target position of the vehicle;
 at least a pair of wheel speed sensors mounted at a pair of vehicle wheels so as to detect a moving amount of the vehicle;
 a computer for determining a path from a current position of the vehicle which moved at the moving amount detected by the at least pair of wheel speed sensors to, the first target position, the vehicle path determining means determining the path by repeatedly calculating the path;
 when the pair of wheel speed sensors does not detect the moving amount of the vehicle, a display to display an image of the rear view from the vehicle, and to superimpose the first target position on the image of the rear view of the vehicle, and when the pair of wheel speed sensors detects a moving amount of the vehicle, the display capable of displaying the image of the rear view of the vehicle and superimposing a second target position of the vehicle on the image of the rear view from the vehicle, the second target position shifted from the first target position based upon the moving amount of the vehicle.

17. A vehicle backward movement assist device according to claim 16, wherein, when the pair of wheel speed sensors detects a moving amount of the vehicle before setting the first target position by the target position confirmation key, the display displays the image of the rear view from the vehicle and superimposes the second target position of the vehicle which moved based upon the first target position and the moving amount of the vehicle.

18. A vehicle backward movement assist device according to claim 16 further comprising:
 at least one indicator operated to move the first target position to the second target position in response to a vehicle parking mode,
 wherein the second target position is superimposed on the image of the rear view from the vehicle.

19. A method of guiding a vehicle parking maneuver comprising the steps of:
 judging whether a shift lever has been shifted to a reverse range;
 displaying an image of a rear view from a vehicle at a display when the shift lever has been shifted to the reverse range;
 judging a vehicle parking mode either at a back-in parking mode or at a parallel parking mode;
 calculating a first target parking position in accordance with the vehicle parking mode;
 superimposing the first target parking position on the image of the rear view from the vehicle;
 calculating a vehicle path from a vehicle current position to the first target parking position;
 judging whether the vehicle has moved after the vehicle path calculation;
 calculating a relative relationship between the current position of the vehicle, which has moved, and the first target parking position when the vehicle is judged to have moved after the vehicle path calculation; and
 updating the first target parking position to a second target parking position, the second target parking position shifted from the first target parking position based upon the moving amount of the vehicle.

20. A method of guiding a vehicle parking maneuver according to claim 19 further comprising:
 judging whether the first target parking position has been confirmed by a driver when the vehicle is judged not to have moved;
 guiding the vehicle parking maneuver when the first target parking position has been confirmed by the driver;
 calculating a vehicle moving amount immediately after the start of the vehicle parking maneuver guiding;
 judging whether the vehicle moving amount has changed;
 calculating the relative relationship between the current position of the vehicle which has moved at the changed vehicle moving amount and the first or second target parking position when the vehicle moving amount is judged to have changed;
 resetting the first or second target parking position to the second target parking position or to a third target parking position;
 superimposing the second or third target parking position on the image of the rear view from the vehicle;
 judging whether the position of the second or third target parking position at the display is needed to be changed;
 operating a target parking position modification key when the position of the second or third target parking position is needed to be changed;
 calculating the relative relationship between the current position of the vehicle which has moved at the changed vehicle moving amount and the second or third target parking position when the target parking position modification key was operated; and
 updating the second or third parking position to a fourth target parking position, wherein the fourth target parking position is superimposed on the image of the rear view from the vehicle in response to the operation of at least one of plural indicators.

* * * * *